US008533674B2

(12) United States Patent
Abrams et al.

(10) Patent No.: US 8,533,674 B2
(45) Date of Patent: Sep. 10, 2013

(54) METHOD, SYSTEM AND APPARATUS FOR PROVIDING PAY-PER-USE DISTRIBUTED COMPUTING RESOURCES

(75) Inventors: Peter C. Abrams, Belmont, CA (US); Rajeev Bharadhwaj, Los Altos, CA (US); Swami Nathan, San Jose, CA (US); Robert Rodriguez, Fremont, CA (US); Craig W. Martyn, San Francisco, CA (US)

(73) Assignee: Clouding IP, LLC, Greensboro, NC (US)

( * ) Notice: Subject to any disclaimer, the term of this patent is extended or adjusted under 35 U.S.C. 154(b) by 773 days.

(21) Appl. No.: 12/415,435

(22) Filed: Mar. 31, 2009

(65) Prior Publication Data

US 2009/0210356 A1  Aug. 20, 2009

Related U.S. Application Data

(62) Division of application No. 09/950,559, filed on Sep. 10, 2001, now Pat. No. 7,596,784.

(60) Provisional application No. 60/232,052, filed on Sep. 12, 2000.

(30) Foreign Application Priority Data

Oct. 17, 2006 (CN) .............................. 200610113805

(51) Int. Cl.
*G06F 9/44* (2006.01)
(52) U.S. Cl.
USPC ............ 717/120; 717/102; 717/117; 717/131
(58) Field of Classification Search
USPC .................................. 717/102, 117, 120, 131
See application file for complete search history.

(56) References Cited

U.S. PATENT DOCUMENTS

| 4,160,877 | A | 7/1979 | Vander Mey |
| 4,253,145 | A | 2/1981 | Goldberg |

(Continued)

FOREIGN PATENT DOCUMENTS

| EP | 0745929 | 4/1996 |
| EP | 0841616 | 5/1998 |
| WO | WO99/48261 | 9/1999 |

OTHER PUBLICATIONS

Wi, Kun Lung and Fuchs, Recoverable Distributed Shared Virtual Memory, IEEE Transactions on Computers, vol. 39, No. 4, Apr. 1990, 10 pages.

(Continued)

*Primary Examiner* — Chuck Kendall

(57) ABSTRACT

Method, system, apparatus, and computer program and computer program product provide on-demand, scalable computational resources to application providers over a distributed network and system. Resources are made available based on demand for applications. Application providers are charged fees based on the amount of resources utilized to satisfy the needs of the application. In providing compute resources, method and apparatus is capable of rapidly activating a plurality of instances of the applications as demand increases and to halt instances as demand drops. Application providers are charged based on metered amount of computational resources utilized in processing their applications. Application providers access the network to distribute applications onto network to utilize distributed compute resources for processing of the applications. Application providers are further capable of monitoring, updating and replacing distributed applications. Apparatus and system includes plurality of computing resources distributed across a network capable of restoring and snapshotting provisioned applications based on demand.

29 Claims, 25 Drawing Sheets

(56) References Cited

U.S. PATENT DOCUMENTS

| | | | |
|---|---|---|---|
| 4,914,619 | A | 4/1990 | Harris et al. |
| 5,067,072 | A | 11/1991 | Talati et al. |
| 5,088,031 | A | 2/1992 | Takasaki et al. |
| 5,109,510 | A | 4/1992 | Baker et al. |
| 5,365,606 | A | 11/1994 | Brocker et al. |
| 5,388,257 | A | 2/1995 | Bauer |
| 5,403,639 | A | 4/1995 | Belsan et al. |
| 5,428,782 | A | 6/1995 | White |
| 5,530,795 | A | 6/1996 | Wan |
| 5,537,417 | A | 7/1996 | Sharma et al. |
| 5,608,720 | A | 3/1997 | Biegel et al. |
| 5,621,726 | A | 4/1997 | Murakimi |
| 5,627,996 | A | 5/1997 | Bauer |
| 5,649,152 | A | 7/1997 | Ohran et al. |
| 5,678,042 | A | 10/1997 | Pisello et al. |
| 5,732,275 | A | 3/1998 | Kullick et al. |
| 5,734,865 | A | 3/1998 | Yu |
| 5,758,355 | A | 5/1998 | Buchanan |
| 5,764,639 | A | 6/1998 | Staples et al. |
| 5,765,205 | A | 6/1998 | Breslau et al. |
| 5,790,114 | A | 8/1998 | Geaghan et al. |
| 5,802,590 | A | 9/1998 | Draves |
| 5,819,044 | A | 10/1998 | Kawabe et al. |
| 5,819,112 | A | 10/1998 | Kusters |
| 5,822,523 | A | 10/1998 | Rothschild et al. |
| 5,832,527 | A | 11/1998 | Kawaguchi |
| 5,848,242 | A | 12/1998 | Behaghel et al. |
| 5,867,661 | A | 2/1999 | Bittinger et al. |
| 5,889,945 | A | 3/1999 | Porter et al. |
| 5,896,500 | A | 4/1999 | Ludwig et al. |
| 5,903,762 | A | 5/1999 | Sakamoto et al. |
| 5,905,990 | A | 5/1999 | Inglett |
| 5,909,545 | A | 6/1999 | Frese, II et al. |
| 5,923,854 | A | 7/1999 | Bell et al. |
| 5,933,838 | A | 8/1999 | Lomet |
| 5,951,650 | A | 9/1999 | Bell et al. |
| 5,956,507 | A | 9/1999 | Shearer, Jr. et al. |
| 5,961,582 | A | 10/1999 | Gaines |
| 6,006,018 | A | 12/1999 | Burnett et al. |
| 6,006,236 | A | 12/1999 | Young |
| 6,016,500 | A | 1/2000 | Waldo et al. |
| 6,058,414 | A | 5/2000 | Manikundalam et al. |
| 6,061,349 | A | 5/2000 | Coile et al. |
| 6,065,123 | A | 5/2000 | Chou et al. |
| 6,094,712 | A | 7/2000 | Follett et al. |
| 6,108,715 | A | 8/2000 | Leach et al. |
| 6,131,148 | A | 10/2000 | West et al. |
| 6,173,332 | B1 | 1/2001 | Hickman |
| 6,201,962 | B1 | 3/2001 | Sturniolo et al. |
| 6,205,450 | B1 | 3/2001 | Kanome |
| 6,212,531 | B1 | 4/2001 | Blea et al. |
| 6,216,159 | B1 | 4/2001 | Chintakrindi et al. |
| 6,247,057 | B1 | 6/2001 | Barrera, III |
| 6,296,431 | B1 | 10/2001 | Miller |
| 6,321,219 | B1 | 11/2001 | Gainer et al. |
| 6,324,690 | B1 | 11/2001 | Luu |
| 6,327,622 | B1 | 12/2001 | Jindal et al. |
| 6,327,703 | B1 | 12/2001 | O'Donnell et al. |
| 6,338,046 | B1 * | 1/2002 | Saari et al. ............ 705/34 |
| 6,363,421 | B2 | 3/2002 | Barker et al. |
| 6,363,497 | B1 | 3/2002 | Chrabaszcz |
| 6,385,613 | B1 | 5/2002 | Grewell et al. |
| 6,430,622 | B1 | 8/2002 | Aiken, Jr. et al. |
| 6,442,663 | B1 | 8/2002 | Sun et al. |
| 6,542,934 | B1 | 4/2003 | Bader et al. |
| 6,567,849 | B2 | 5/2003 | Ludovici et al. |
| 6,704,282 | B1 | 3/2004 | Sun et al. |
| 6,707,820 | B1 | 3/2004 | Arndt et al. |
| 6,714,549 | B1 | 3/2004 | Phaltankar |
| 6,771,290 | B1 | 8/2004 | Hoyle |
| 6,779,016 | B1 | 8/2004 | Aziz et al. |
| 6,880,156 | B1 | 4/2005 | Landherr et al. |

OTHER PUBLICATIONS

Cheriton, David R and Duda, Kenneth J., A Caching Model of Operating System Kernel Functionality, Proc. First Symposium on Operating Systems Design and Implementation, Usenix Association (Nov. 1994).

Reed, Dickson et al., "Xenoservers: Accountable Execution of Untrusted Programs," Proceedings of the Seventh Workshop on Hot Topics in Operating Systems (Mar. 29-30, 1999), 6 pages.

Foster, Ian et al., "The Grid: Blueprint for a New Computing Infrastructure," Morgan Kaufmann Publishers, Inc., 1st edition (1998), 245 pages.

Grimshaw, Andrew S. et al., "Campus-Wide Computing: Early Results Using Legion at the University of Virginia," International Journal of High Performance Computing Applications (1997), 16 pages.

London, Shmulik, "POPCORN—A Paradigm for Global-Computing," Master's Thesis, The Hebrew University of Jerusalem (Jun. 1998), 94 pages.

Camiel, Noam, "The Shared Object POPCORN System," Master's Thesis, The Hebrew University of Jerusalem (Jul. 1999), 65 pages.

Neuman, Clifford B. et al, "The Propsero Resource Manager: A Scalable Framework for Processor Allocation in Distributed Systems," Concurrency: Practice and Experience, vol. 6(4) (Jun. 1994), 17 pages.

Grimshaw, Andrew S. et al., "Legion 1.4 Basic User Manual," University of Virginia (1998), 8 pages.

Declaration of Dr. Andrew Grimshaw, Ph.D., Dec. 21, 2012 and appendix, 313 pages.

* cited by examiner

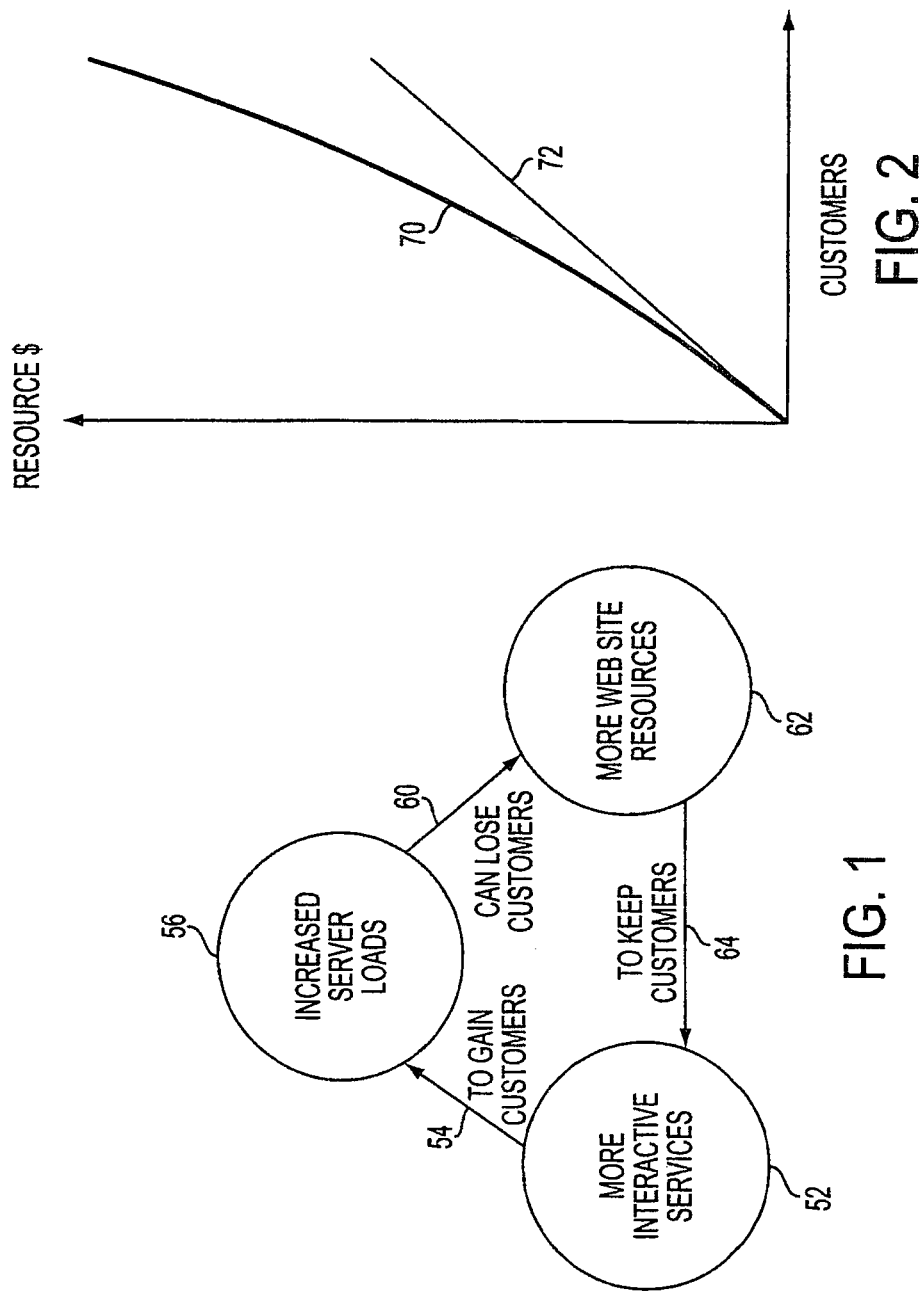

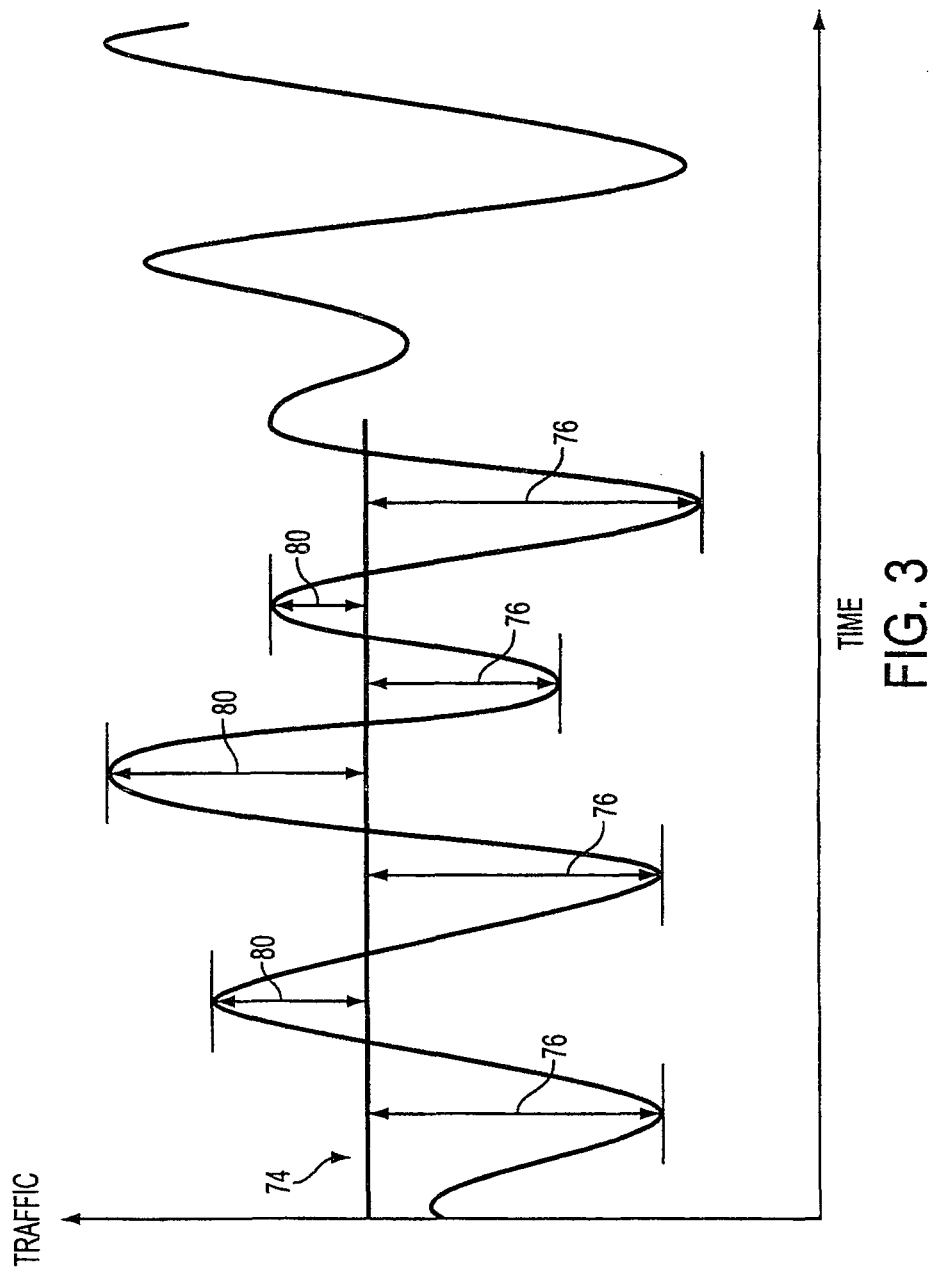

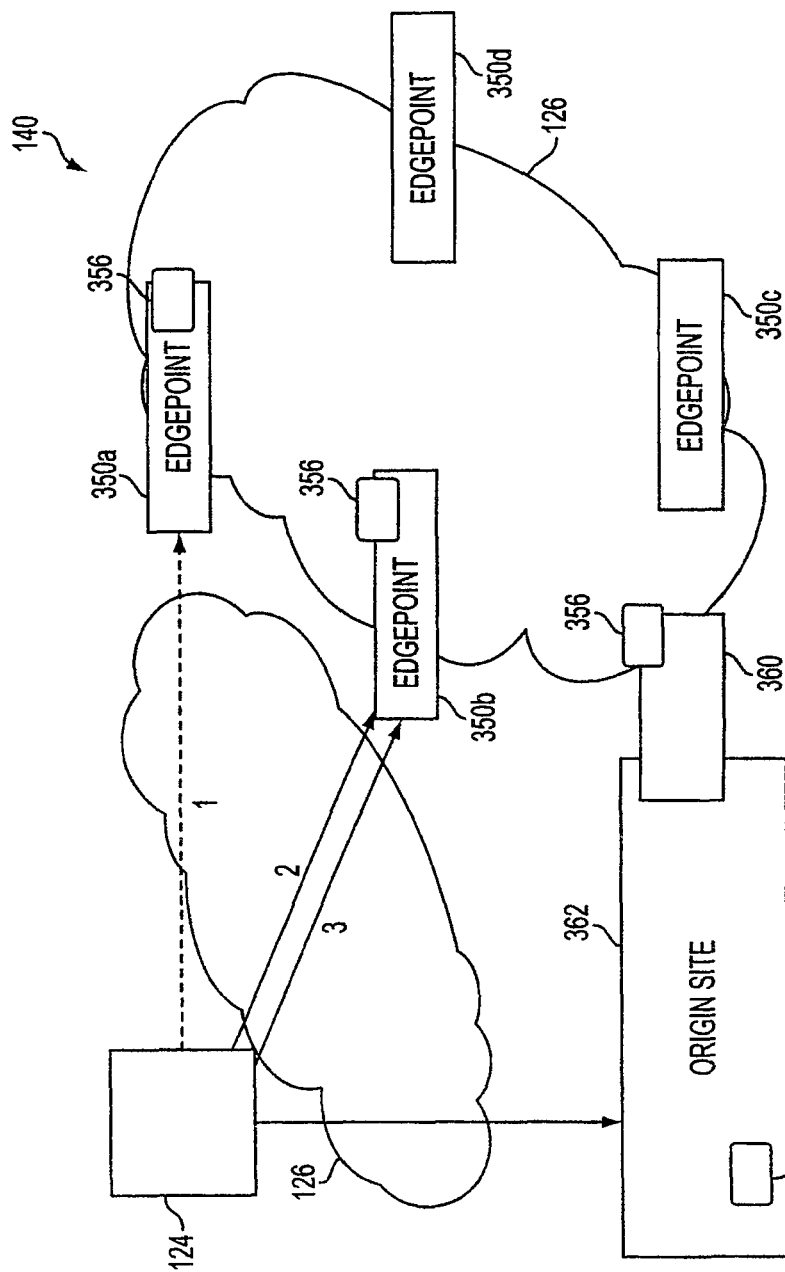

METHOD, SYSTEM AND APPARATUS FOR PROVIDING PAY-PER-USE DISTRIBUTED COMPUTING RESOURCES

RELATED APPLICATIONS

This application is a divisional of U.S. patent application Ser. No. 09/950,559, entitled "METHOD, SYSTEM AND APPARATUS FOR PROVIDING PAY-PER-USE DISTRIBUTED COMPUTING RESOURCES," filed Sep. 10, 2001, now U.S. Pat. No. 7,596,784 which claims priority to U.S. Provisional Application Ser. No. 60/232,052, filed on Sep. 12, 2000, entitled A Method and Apparatus for Providing Pay-Per-Use, Distributed Computing Capacity.

The present application incorporates the following applications in their entirety by reference:

A Method and Apparatus for Providing Pay-Per-Use, Distributed Computing Capacity, U.S. Provisional Application Ser. No. 60/232,052, filed on Sep. 12, 2000;

Snapshot Virtual Templating, U.S. patent application Ser. No. 09/684,373, filed on Oct. 5, 2000;

Dynamic Symbolic Link Resolution, U.S. patent application Ser. No. 09/680,560, filed on Oct. 5, 2000;

Snapshot Restore of Application Chains and Applications, U.S. patent application Ser. No. 09/680,847, filed on Oct. 5, 2000;

Virtual Resource-ID Mapping, patent application Ser. No. 09/680,563, filed on Oct. 5, 2000; and Virtual Port Multiplexing, patent application Ser. No. 09/684,457, filed on Oct. 5, 2000.

FIELD OF INVENTION

In general the invention pertains to computer application processing, more particularly to distributed computing for computer application processing, and most particularly to system and method for providing computer application processing with dynamic capacity control and pay-per-use usage charging on an on-demand basis.

BACKGROUND

There is a trend of emerging computing infrastructure aimed at on-demand services, particularly for Internet or other distributed networked computing services. There are basically three categories of on-demand services that are currently available. The first is content delivery, the second is storage, and the third is bandwidth. These services are provided as needed or on-demand, based on a user's needs at any given time. For example, if a first data provider needs greater storage space, an on-demand storage provider simply allocates a greater amount of storage memory to that user, and the first data provider is charged based on the amount of memory space used. If the first data provider no longer needs that amount of memory and deletes information, the on-demand storage provider is then able to re-allocate that memory space to an alternative data provider and the first data provider is charged less because of the reduced storage use.

One of the problems that companies with substantial IT investments face is that it is very difficult for them to predict how much demand they will have for their applications (capacity planning). Therefore, it is extremely difficult for them to determine how large a server farm to deploy which will allow greater user access to their services.

Another problem faced by application or website providers is the continued need for resource capacity to provide adequate service to their users. This is also referred to as the scalability problem. FIG. 1 shows a simplified block diagram representation of the diseconomy of scale result ing in the server infrastructure. What is seen is that application providers are in what is sometimes referred to as a high growth spiral. In the high growth spiral the application provider starts by building a service 52 to gain application users or customers 54. The increase in users results in an increase in the application providers server loads 56. This increased server load causes an increase in response time and often results in the application provider's sites failing or going down, which may result in a loss 60 of users. The application provider must then invest in more resources and infrastructure 62 to reduce response time, improve reliability and keep their users happy 64. This increased response time, and reliability then attracts more users 54, which returns the application provider back to a point where the increased load demands stress or tax the application provider's servers 56, result ing again in a slower response time and a decrease in reliability. Thus, application providers are constantly going around in this high growth spiral.

FIG. 2 shows a graphical representation of the cost per user to increase resource capacity. One of the problems faced by application providers is that the cost of server infrastructure may typically increase faster than the current number of users so that costs are non-linear. This means that as the application provider's server farm gets more complex the cost delta 70 to add enough capacity to service one additional user increases. Thus, the cost 70 of continuing to grow increases dramatically in relation to the cost per user. With most every other business, as the business grows, economies of scale come into effect and the costs per user served actually decreases 72. This is one of the real problems faced by application providers.

Bottlenecks exist in various system resources, such as memory, disk I/O, processors and bandwidth. To scale infrastructure to handle higher levels of load requires increased levels of these resources, which in turn require space, power, management and monitoring systems, as well as people to maintain and operate the systems. As user load increases, so does complexity, leading to costs increasing at a faster rate than volume.

Another problem with providing application processing or services is the amount of capacity that will be needed at start-up, as well as the capacity needs in the future to maintain response time and reliability. These are both start-up costs. It is relatively impossible to predict in advance, with any degree of accuracy, just how successful a site or service is going to be prior to launching and activating the site.

FIG. 3 shows a graphical representation of user capacity demands of an application provider. When an application provider installs a certain number of servers, whatever that number is, the provider has basically created a fixed capacity 74, while demand itself may be unpredictable. Because of the unpredictability of usage demands on servers, that fixed capacity 74 will be either too high 76, and the application provider did not have as many users as anticipated result ing in wasted capacity 76 and wasted capital. Or the fixed capacity 74 was too low 80, and the application provider obtained more users than predicted, result ing in insufficient capacity 80. Thus, if the fixed capacity 74 is too high, the application provider has invested too much capital 76. If the fixed capacity 74 is too low 80, the application provider has users who are dissatisfied because the user does not get the service they need or it takes too long to get responses. This unpredictability is an extremely difficult problem faced by companies providing application processing and services and is particularly severe for those providing services over the Internet simply because of the dynamics of the Internet. The demand is completely unpredictable, and is substantially impossible to plan.

One problem faced by on-line application providers or other users of distributed computing networks is that the network is actually very slow for interactive services as a result of large traverses across the network, because communication signals run into the inherent latency of the network. For example, if an Internet user is in New York, but that New York user want to access a website that is serviced in Los Angeles, the New York user must be routed or hopped all the way across the U.S. Sometimes users will be routed all the way around the world, to get to a specific site. These long distance routings run into large amounts of latency delay. This inherent latency of distributed networks is amplified by the significant increase in the number of interactive services deployed by application and website providers having very active pages or sites. Further, there is a general trend towards customized pages per user. These are sites which are custom created by the server or application for a particular user. These customized sites reduce caching effects to substantially zero. Thus, a customized page, created for that specific user, is generated at the server origin site and routed all the way back across the net to the user adding further inherent delays in the response time. This adds up to a very slow service for more complex interactive services.

In prior art systems, application providers wishing to provide applications have to buy or lease a server, then they must buy or develop the applications that are going to be loaded and run on that server, load the server, and activate the server to provide access to that application. The server is a fully dedicated resource, so that 100% of the time an application is dedicated to a specific server.

Prior art application processing systems require an application provider to route a user to a single central site to allow access to the applications. Every user attempting to access the application is directed to the single central site. Thus, result ing in a bottle neck at the central site. In the prior art single server or single central site, the application provider, however, does maintain access to and control over the application. In some systems where the application provider outsources their server capacity, the application provider must select from a preselected limited number of applications. Further, the application provider no longer has direct control over the application. Any changes desired require the application provider to submit a request to the server provider. Then the server provider must schedule a time at low demands to take the server down to make the changes. This process results in large lag times between the decision to make changes and the implementation of those changes.

SUMMARY

The novel method, apparatus, computer readable medium and computer program product of the present invention provides on-demand, scalable computational resources to application providers over a distributed network and system. The resources are made available upon receiving requests for a first application. Once a request is received, routing of the request is determined and the request is routed to access the first application. The application provider is then charged based on the amount of resources utilized to satisfy the request. In determining routing the method and apparatus determines if a first instance of a first application is active, and if the first instance is at a capacity. A first set of compute resources is provided to satisfy the first request and the amount charged to the first application provider is increased based on the first set of compute resources. In one embodi-ment, the method and apparatus activates a second instance of the first application on a second set of the available compute resources if the first instance is at capacity and the amount charged to the first application provider is increased based on the second set of compute resources. As a result, resources needed are dynamically available on demand, and freed when not needed. The application provider is only charged for services that are actually used.

In one embodiment, a third set of compute resources are freed up if the compute resources are not available. A second instance of the first application is restored on a fourth set of compute resources such that the fourth set of compute resources includes at least a portion of the freed up third set of compute resources, and the amount charged to the first application provider is increased based on the fourth set of compute resources. In freeing up resources, a first instance of a second application is snapshotted, wherein the second application is provided by a second application provider, and an amount charged to the second application provider is reduced based on the freed up third set of compute resources.

The method and apparatus provides application providers with access to the network, where the network includes the distributed compute resources configured to provide the application processing and allows the application providers to distribute applications onto the network to utilize the distributed compute resources for processing of the applications. The application providers are further capable of monitoring, updating and replacing the distributed applications. The method and apparatus increases the amount of compute resources utilized in providing processing for an application as demand for the application increases. As the amount of compute resources is increased the amount charged to the application provider is increased based on the amount of compute resources utilized. As demand for the application falls, the amount of resources is reduced and the amount charged the application provider is reduced.

In one embodiment, the apparatus for providing the on-demand compute resources includes a first resource manager, at least one snapd (snapshot or snapshot daemon) module configured to snapshot an active application, at least one restored (restore daemon) module configured to restore a snapshotted application, and a first set of compute resources configured to provide application processing. The resource manager couples with and provide at least some control to the snapd module, restored module and the first set of compute resources. The resource manager is further configured to monitor the amount of the first set of compute resources utilized in providing application processing. In one embodiment, the apparatus includes at least one perfd (performance or performance daemon) module coupled with the first resource manager and the first set of compute resources, and is configured to monitor the first set of computational resources and provide the resource manager with compute resource utilization. In one embodiment, a deploy module couples with the first resource manager and the first set of compute resources, and is configured to receive at least one application from at least one of the application providers, and provision the first set of compute resources to be utilized in processing the at least one application. A conduit couples with the deploy module, and is configured to provide the application providers with access to the deploy module to distribute applications or updates for application processing. A local dispatcher couples with the first resource manager and the first set of compute resources, and is configured to receive directions from the resource manager and to provide routing of requests for the at least one application to the first set of compute resources. In one embodiment, the resource manager, snapd module, restored module, perfd module, local dispatch module and deploy module are cooperated into a single edgepoint. In one embodiment, the apparatus includes a plurality of edgepoints distributed to provide the on-demand, distributed compute resources.

In one embodiment, the apparatus includes a plurality of sets of compute resources and a plurality of resource managers, such that the sets of compute resources are utilized for application processing. Further, a global dispatcher coupled with the plurality of resource managers, wherein the global dispatcher is configured to receive requests for at least one application and to route the requests to an optimal resource manager. In one embodiment, the apparatus includes one or more compute modules which comprise at least a snapd module, a restored module and at least a third set of compute resources.

In one embodiment the novel network providing on-demand compute resources includes a first means for application processing configured to provide application processing, a first application distributed onto the network and configured to be processed by the first means for application processing, a first means for managing application processing coupled with the first means for application processing, and configured to activate at least a first instance of the first application on a first set of the first means for application processing based on a first amount of demand for the first application. The network further includes a means for monitoring coupled with the first means for application processing, and configured to monitor at least the first set of the first means for application processing utilized to provide the entity with access to the first instances of the first application, and a means for determining an amount to charge coupled with the first means for application processing, and configured to determine an amount to be charged based on the first set of the first means for application processing utilized in providing the entity with access to the first instance of the first application. The means for managing application processing is further configured to activate a second instance of the first application on a second set of the first means for application processing based on a second amount of demand for the first application. The means for monitoring is further configured to monitor the second set of the first means for application processing utilized to satisfy the second amount of demand for the first application, and the means for determining an amount to charge is configured to determine an amount to be charged based on the second set of the first means for application processing utilized in providing access to the second instance of the first application. The means for managing application processing is further capable of deactivating one of the first and second instances of the first application based on a third amount of demand for the first application In one embodiment, the method and apparatus includes a plurality of means for application processing, and a means for dispatching coupled with the plurality of means for application processing. The means for dispatching is configured to route at least one entity to an optimal means for application processing allowing the at least one entity access to at least one application. In one embodiment means for application processing is an edgepoint. In one embodiment, the means for dispatching is a global dispatcher. In one embodiment, the means for application processing is a compute module.

In one embodiment, the system, method, and business operating model provide a computer application processing capacity as a pay-per-use utility on demand.

BRIEF DESCRIPTION OF THE FIGURES

The invention, together with further advantages thereof, may best be understood by reference to the following description taken in conjunction with the accompanying drawings in which:

FIG. 1 shows a simplified block diagram representation of the diseconomy of scale result ing from the server infrastructure;

FIG. 2 shows a graphical representation of the cost per user to increase resource capacity;

FIG. 3 shows a graphical representation of user capacity demands of an application provider;

FIGS. 15A-C show a simplified block diagram of one implementation of one embodiment of the novel on-demand apparatus and the optimal user and entity routing provided by the present invention;

DETAILED DESCRIPTION

Figure 4:
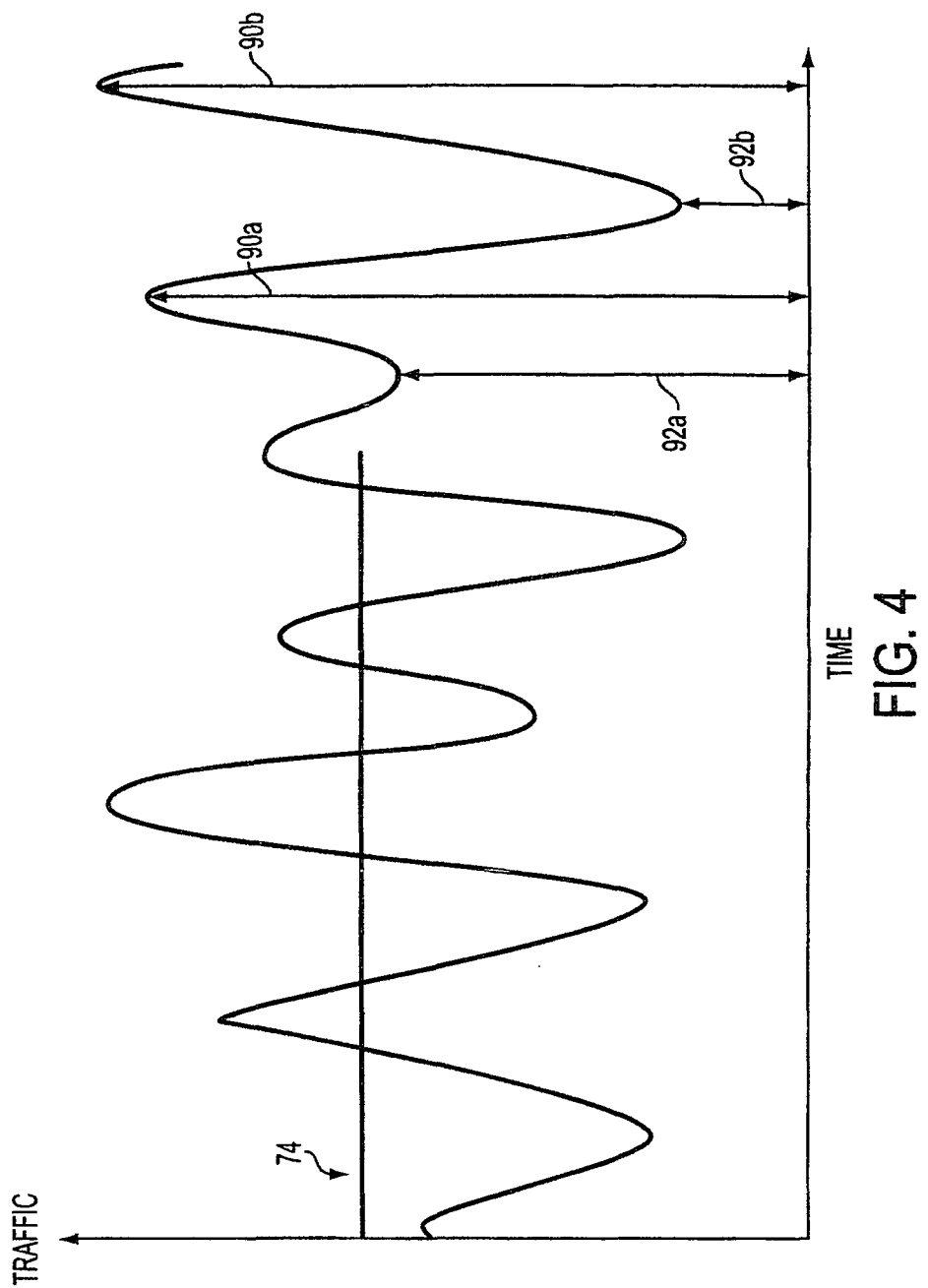
FIG. 4 shows a graphical representation of the on-demand response of the present on-demand system.

Among other aspects and innovations, the invention provides structure, system, method, method of operation, computer program product, and business model and method for providing distributed on-demand application processing.

There is a missing category in the available internet infrastructure based on-demand services. On-demand services fail to provide on-demand application processing, delivered as an on demand infrastructure service.

In one embodiment, the present invention provides for on-demand application processing, delivered as an on demand internet (or other networked) infrastructure service. Application processing may for example include one or more of, but is not limited to, deploying, instantiating, running and operating an application. One of the major benefits of providing this type of on-demand service is improvement in operational and other economics. The novel on-demand application processing method and system of the present invention improves: operational economics such as the elimination of costly server infrastructure expansion, simplifying and reducing capacity planning and an economic cost based on use; and user satisfaction by providing a maximum and assured application, such as an internet site, responsiveness under substantially any user load and for users located substantially anywhere. The present inventive on-demand application processing method and system changes the economic focus of server infrastructure.

The novel on-demand application processing method and apparatus of the present invention solves an application provider's capacity planning problem. For example, an application provider is an entity that provides a service via a computer network such as, Charles Schwab, WebVan-like entities, Walmart.com, and Intuit, which provide various types of applications accessed by individuals or entities over the internet. One of the problems that such companies face is that it is very difficult for them to predict how much demand they will have for their services and applications. Therefore it is extremely difficult for them to determine how large a server farm to deploy to allow greater user access to their services.

The present on-demand application processing method and apparatus solves this problem by providing on-demand processing capacity. Thus, the on-demand system provides the application provider with additional access to further processing capabilities without the need or expense of the application provider trying to predict how much processing capability will be needed. Further, one of the advantages of the present on-demand application processing method and system is that the application provider's cost is based on the amount of processing capability actually used. Thus, instead of having a huge up front capital investment to provide the expected processing capabilities and thus take all the risk to create these services, the present on-demand application processing method and system provides the application processing capacity based on demand, avoiding the need to predict processing needs, and eliminating the up-front capital investment.

Another major benefit provided by the novel on-demand application processing method and system is application user or customer satisfaction. An application user's satisfaction is achieved and maintained because the on-demand application processing substantially improves the response time of applications by increasing the processing capacity as the demand increases, is capable of spreading the load across a plurality servers, and enhancing consistency. The on-demand application processing system is further able to put a cap or limit on how much response time is built into the server side of application processing.

The present on-demand application processing method and system solves the growth spiral and the exponential cost per user increase in providing applications and services over the internet by supplying resource capacity based on the demand for the applications. The present on-demand method and system will increase resource capacity to an application provider as user access grows, and will also reduce resource capacity as user access decreases. Thus, the application provider simply pays for the amount of resources needed and used.

The present invention provides an ideal solution to the fixed capacity problem shown in FIG. 3, through a flexible on-demand variable capacity providing substantially unlimited server infrastructure capacity which responds within seconds because demand patterns change within seconds. FIG. 4 shows a graphical representation of the on-demand response of the present on-demand system. The present on-demand application processing system solves the unpredictable capacity problem by providing on-demand server or application processor capabilities with a response time of seconds or less. If the capacity demand increases, the on-demand capacity of the present invention adjusts to supply further capacity 90a and 90b. If the capacity demand decreases, the on-demand capacity of the present invention adjusted to supply less capacity 92a and 92b, thus reducing the overall cost.

The present invention provides an ideal solution, by providing substantially instant variable capacity. As an example, the present invention provides an infrastructure or virtual infrastructure, which comes on-line or is activated for those peak times (i.e., those 10 minutes) when a site gets a rush of Web traffic, and then the virtual infrastructure reduces or go away when the Web traffic is reduced. Further the present invention provides substantially unlimited processing resources, thus providing as much processing as is needed. The present invention further provides unlimited processing resources with a global reach, because application providers now have users all over the world. The present invention further provides this substantially unlimited capacity to application providers at a pricing scheme which charges the application providers for the amount of capacity utilized, obviating the need for capital expenditures. The present on-demand application processing method and system is flexible and capable of running substantially any application, thus the application providers are not limited or locked into a particular application. The present invention provides the application providers with the ability to have the freedom to choose their own application sets. Further, the present invention allows the application sets to be completely under the application provider's control. As an example, once an application provider deploys an application set, the application provider maintains control over that application set, the data in and related to the application set, and other such control features.

Thus preventing an application provider from being at the mercy of someone else owning their application set. Instead, the application provider maintains complete control over the services provided through the distributed application set.

Figure 5:
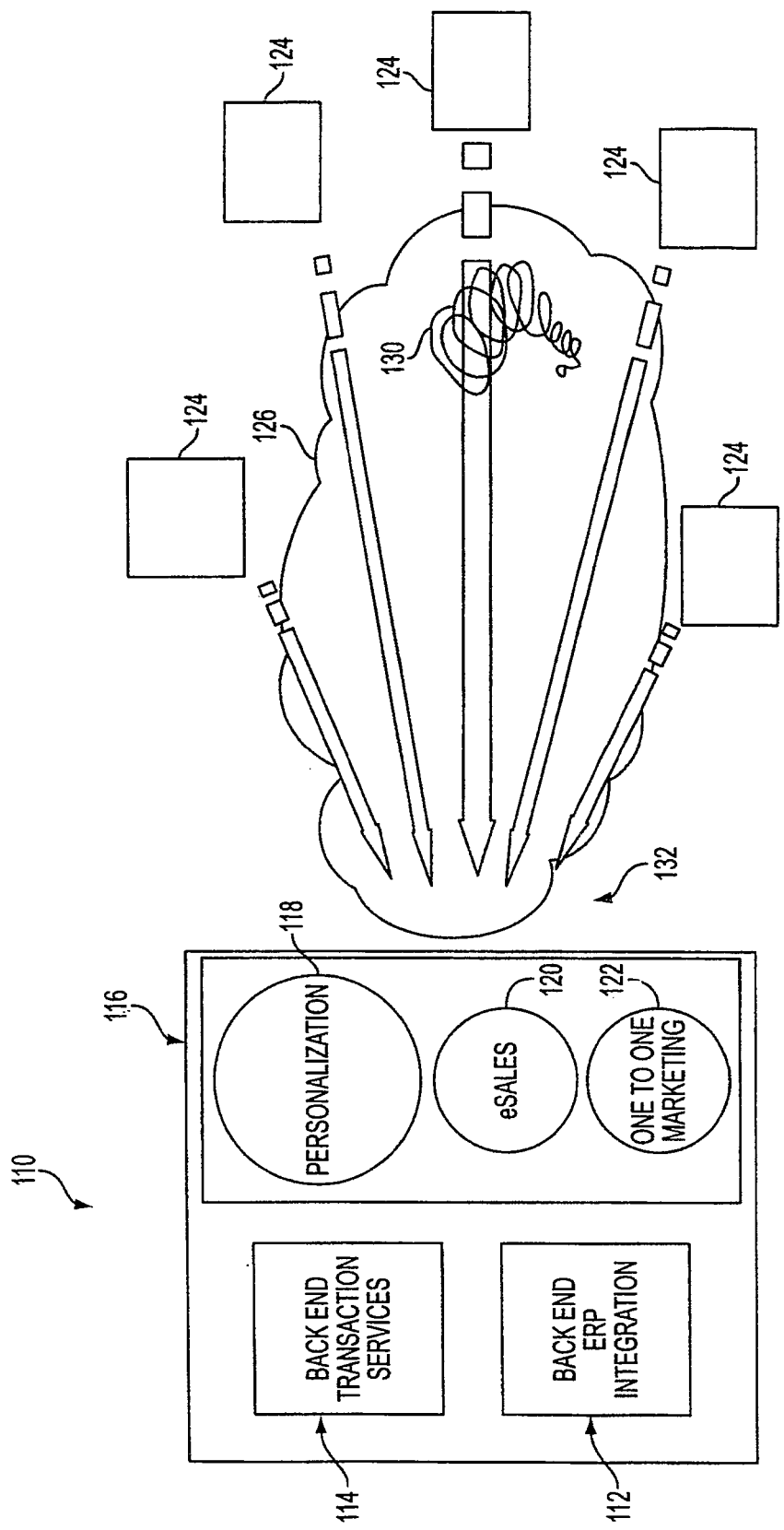
FIG. 5 depicts a simplified block diagram of a business operating over the Internet, sometimes referred to as an e-business.

FIG. 5 depicts a simplified block diagram of a business operating over the Internet, sometimes referred to as an e-business. Generally, an e-business has a set of servers 110 that run several or all of their different applications. The servers 110 have back end ERPs 112, back end transaction systems or services 114, and front end systems 116 including, but not limited to, personalization service 118, an e-selling system 120, and a one-to-one marketing system 122, which is found in a central site. Users 124 gain access through the internet 126 to the central server or central site 110. As the number of users 124 accessing the server 110 increases, a tornado effect 130 results, and a bottleneck 132 is created, adversely affecting the response time and reliability of the site.

Figure 6:
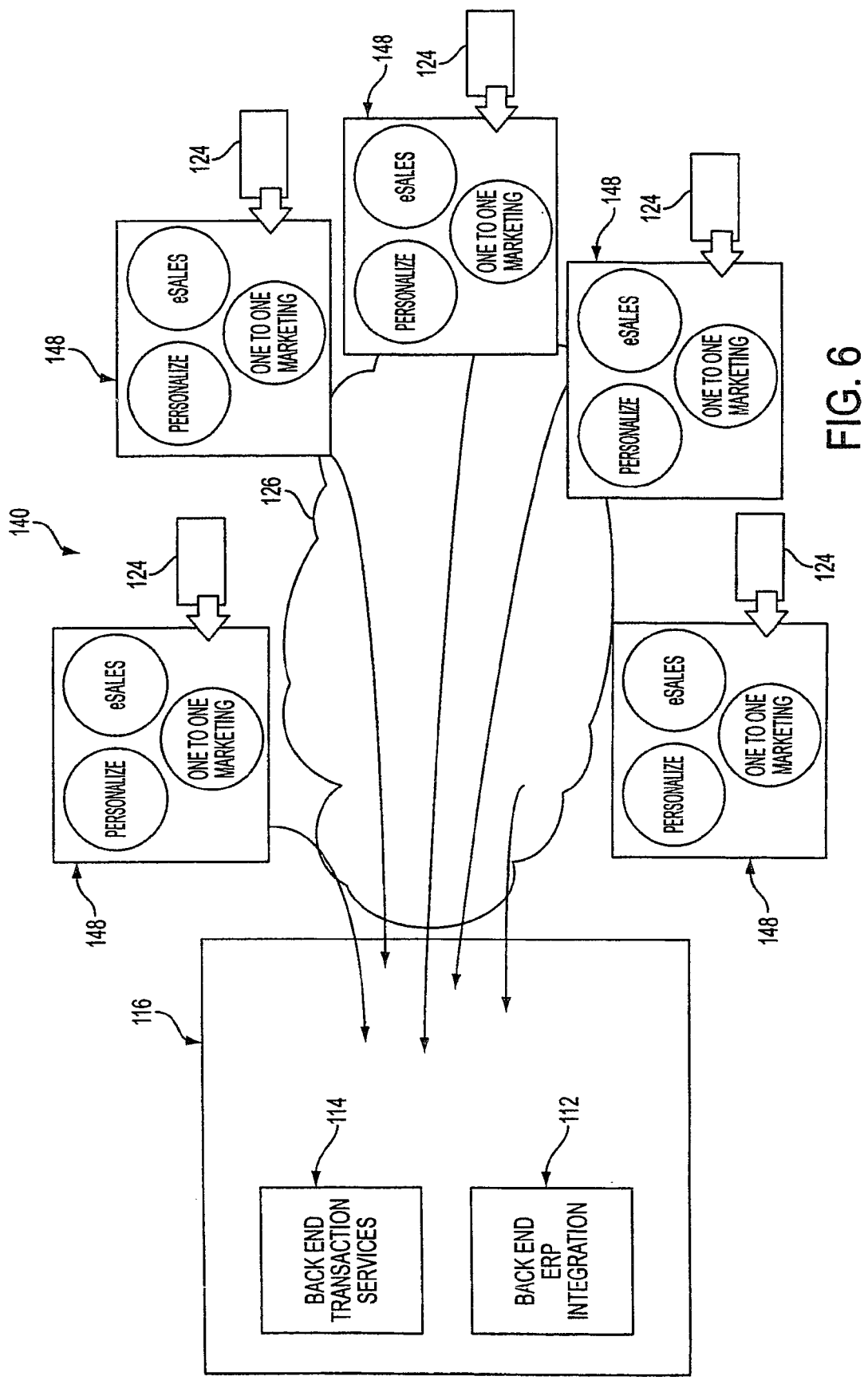
FIG. 6 depicts a simplified schematic block diagram of one embodiment of the novel distributed on-demand application processing system which substantially eliminates the bottleneck and tornado effects seen in the prior art.

FIG. 6 depicts a simplified schematic block diagram of one embodiment of the novel distributed on-demand application processing system 140 of the present invention which substantially eliminates the bottleneck and tornado effects seen in the prior art. In one embodiment, the present on-demand system 140 pushes or distributes application processes, such as the front end systems, including, but not limited to, personalization 118, eSales 120, and one-to-one marketing 122 (see FIG. 5), out into the Internet 126, and out into the infrastructure of the Internet. In one embodiment, distributed compute resources, such as processors, computers and/or servers 148, of the on-demand system 140 are geographically distributed, and in one embodiment located and installed globally all around the world. By geographically distributing the servers 148, the application processing can also be distributed, allowing traffic from users 124 to be distributed and routed to the servers 148 distributed across the Internet 126. In one embodiment, final applications or transactions, such as final purchases, and any other conventional transaction, are routed back across the internet 126 to the transactions system 114 and the ERP system 112. In one embodiment, the transaction system 114 and the ERP system 112 are not moved out or distributed across the distributed servers 148. As an example, a user 124 does his/her shopping and configuring, and the like as well as determining what he/she would like to buy, through a distributed server 148 which is geographically closer to the user in the on-demand system 140. In one embodiment, once the user 124 selects or hits the "buy" button of the interactive website to complete the sales transaction, that transaction is forwarded to the backend systems 112 and 114 maintained on the application provider's central servers to complete the transaction. Thus, significantly reducing the amount of traffic into the application provider's central servers, eliminating the bottle neck effect, improving performance, enhancing response time, and thus improving and maintaining user satisfaction.

In one embodiment, the entire central site including the back end ERP 112 and transactions service 114 are distributed out onto the distributed on-demand system 140. Thus, even the final transactions, such as the final purchase, are preformed on the distributed servers 148.

Figure 7:
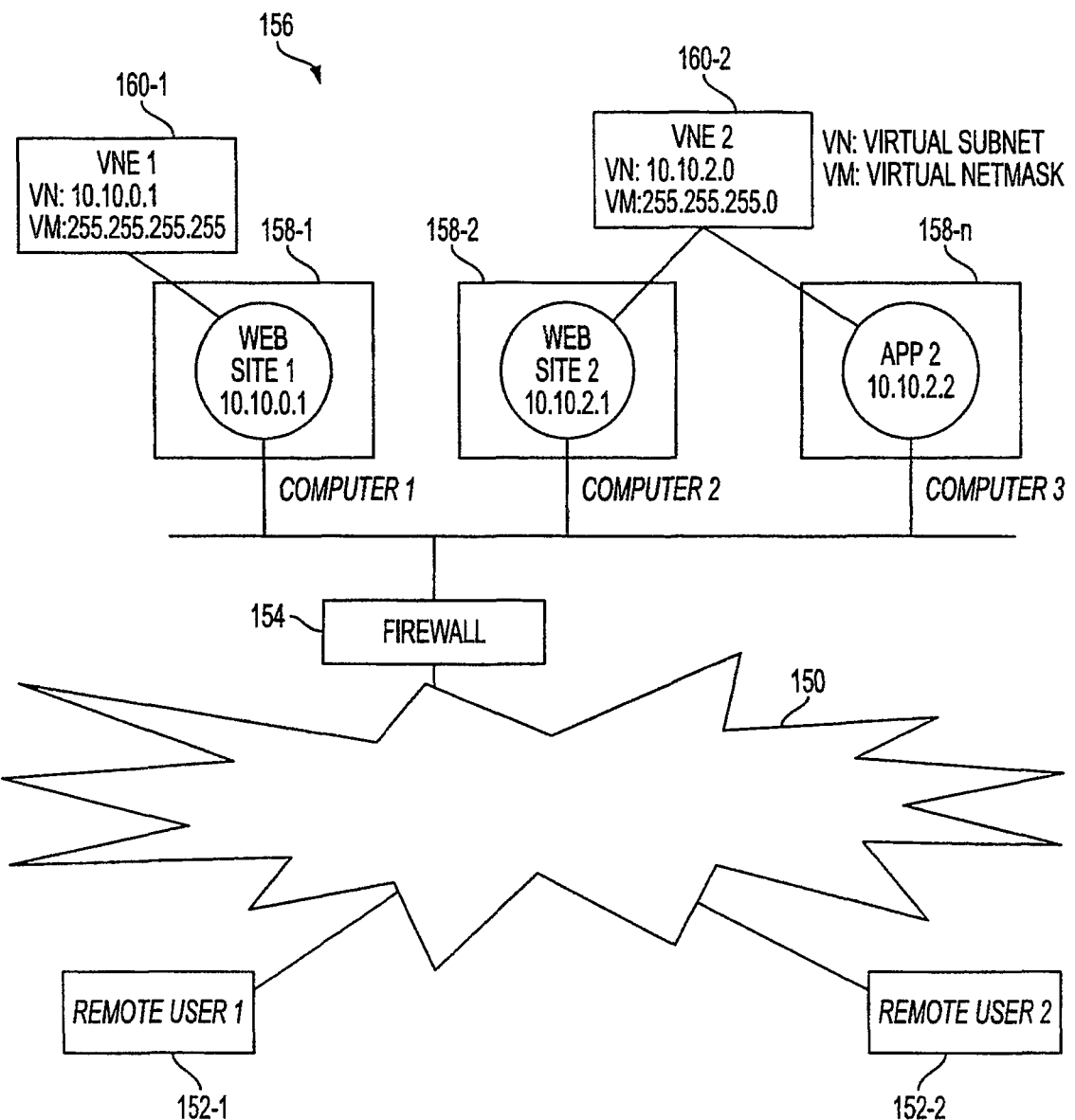
FIG. 7 illustrates in high level block diagram form one implementation of one embodiment of the overall structure of the present invention as used in connection with a computer network such as the internet.

FIG. 7 illustrates in high level block diagram form one implementation of one embodiment of the overall structure of the present invention as used in connection with a computer network 150 such as the Internet. In one embodiment, computer network 150 is a direct link between one or more remote entities, such as the users 152-1 and 152-2, a separate application, a server, a process, computational device and substantially any other entity capable of issuing requests for application processing. In one embodiment, computer network 150 is a network providing an indirect link, such as an intranet or global network (i.e., the Internet). Remote users 152-1 and 152-2 utilize the computer network 150 to gain access to a plurality of computers or servers 158-1, 158-2, through 158-n. In one embodiment, the computers 158 are protected by a firewall 154. In one embodiment, computers 158 are edgepoints (described more fully below), groups of edgepoints, global dispatchers or other components of a private network 156. In one embodiment, computers 158 are used to run various applications, such as hosting web sites for access by remote users 152. In one embodiment, the present invention is implemented on computer network 156 in the form of virtual environments 160-1 and 160-2. While only two virtual environments are illustrated, it is to be understood that any number of virtual environments may be utilized in connection with the present invention.

Figure 8:
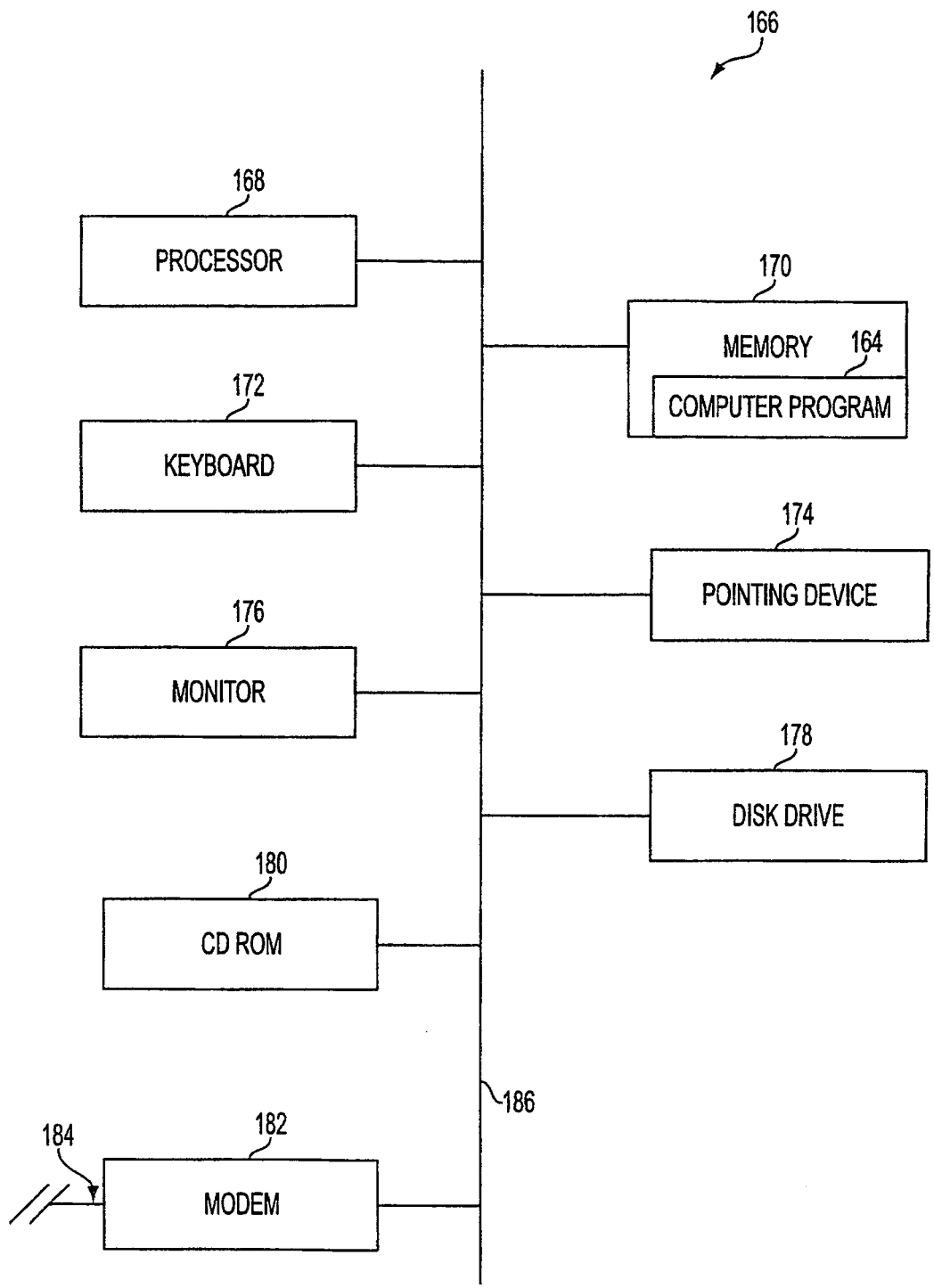
FIG. 8 depicts a block diagram of one embodiment of a computer for implementing the on-demand method and apparatus of the present invention in a computer readable medium.

In one embodiment, the method and system of the present invention is implemented in a computer readable medium, such as a computer program 164 and executed on a computer 166 as illustrated in the high level block diagram of FIG. 8. As shown, computer 166 incorporates a processor 168 utilizing, in one embodiment, a central processing unit (CPU) and supporting integrated circuitry. A memory 170 which is any type or combination of memory including fast semiconductor memory (for example, RAM, NVRAM or ROM), slower magnetic memory (for example, hard disk storage), optical memory and substantially any conventional memory known in the art, to facilitate storage of the computer program 164 and the operating system software. In one embodiment, also included in computer 166 are interface devices including, but not limited to, keyboard 172, pointing device 174, and monitor 176, which allow a user to interact with computer 166. Mass storage devices such as disk drive 178 and CD ROM 180 may also be included in computer 166 to provide storage of information. Computer 166 may communicate with other computers and/or networks via modem 182 and telephone line 184 to allow for remote operation, or to utilize files stored at different locations. Other media may also be used in place of modem 182 and telephone line 184, such as a direct connection, high speed data line or a wireless connection, and the like. In one embodiment, the components described above may be operatively connected by a communications bus 186. In one embodiment, the components may be operatively connected by wireless communication.

Figure 9:
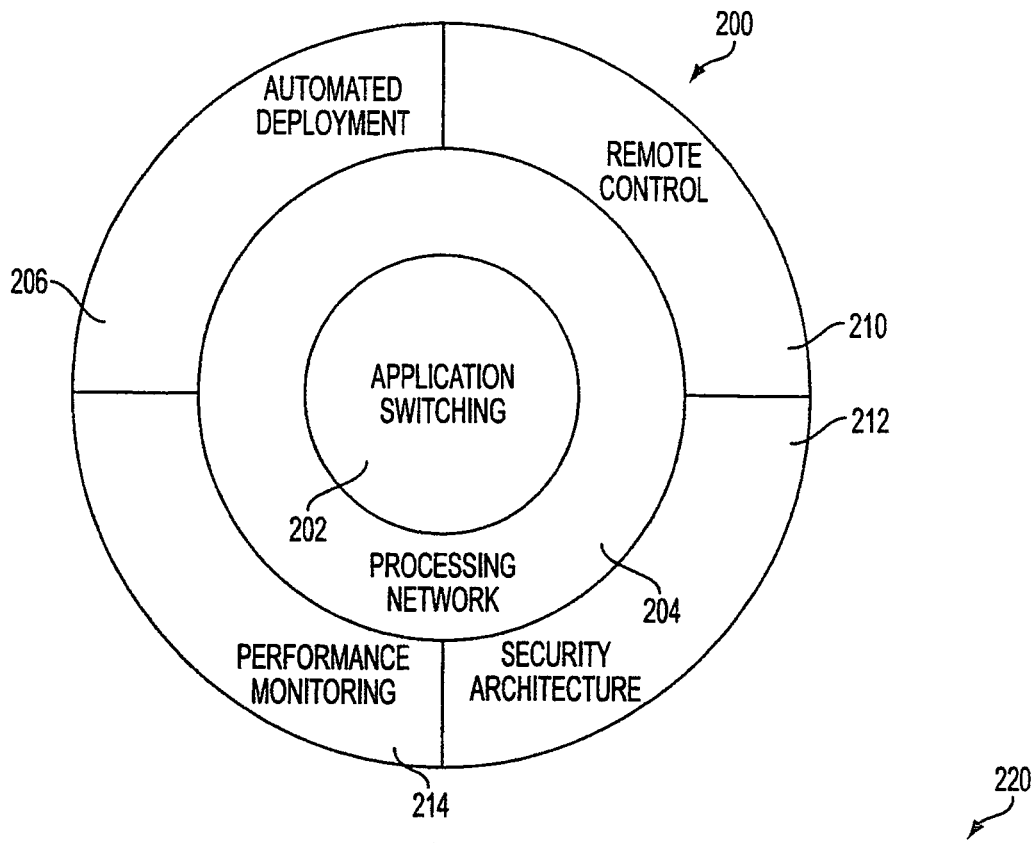
FIG. 9 shows a simplified block diagram of one embodiment of an overall system architecture for the distributed, on-demand application processing service and system of the present invention.

FIG. 9 shows a simplified block diagram of one embodiment of an overall system architecture 200 for the distributed on-demand application processing service and system 140. The on-demand system 140 includes an application switching architecture or technology 202 configured to provide application switching, an edge processing network 204, which, in one embodiment, is hundreds of machines, edgepoints or servers in hundreds of data centers distributed throughout the world and/or the internet, automated deployment 206, remote control 210, security architecture 212, and performance monitoring 214, all coupled to cooperate and provide application processing, and deployment.

Some of the advantages provided by the on-demand method and system 140 include: protection during peak loads, in one embodiment, with guaranteed application response time SLA; global reach with application provider control of distributed web presence; freedom to grow aggressively including elastic web-processing infrastructure on demand; no capital investment with costs based on the amount of capacity used; supporting substantially any application on substantially any platform to preserve application provider's current application investment; and higher reliability because the system provides superior response time and automatically routes around failures.

Figure 10:
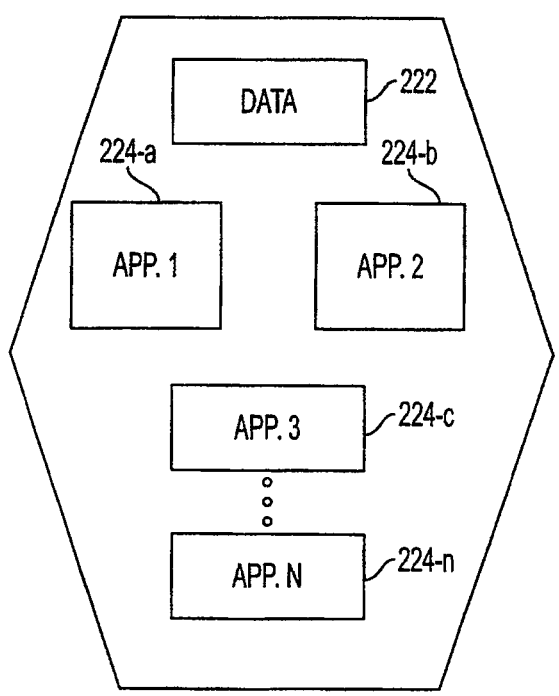
FIG. 10 shows a simplified block diagram of one embodiment of the application switching architecture.

FIG. 10 shows a simplified block diagram of one embodiment of the application switching architecture 202. In one embodiment, the application switching architecture 202 includes an application snapshot or appshot 220. An appshot 220 is a set of all data and/or state necessary to halt (and then restore and restart) at least one application at a given point in time, such that, the application may be restored at a later time on substantially any machine. For example, an appshot 220 can be an already running application halted at a point in time without the application knowing it was halted. In one embodiment, an appshot 220 is the encapsulation of an application stack of at least one running application, including the different processes, states, and interprocess communication. For example, a set of interdependent and/or interacting applications halted together may be included in an appshot 220. In one embodiment, the appshot 220 includes, data 222, and a set of interactive applications, 224a-224n.

One example of an appshot 220 is a configuration engine, which allows users to shop on-line and decide exactly what they want to purchase. A snapshotted application and/or process, and the method for performing a snapshot is more fully described in co-pending U.S. patent application Ser. No. 09/680,847, filed on Oct. 5, 2000, incorporated in its entirety herein by reference.

In one embodiment, an appshot 220 encapsulates a multi-tier applications stack, including data 222. The present on-demand application processing method and system 140 performs this appshot encapsulation or snapshotting which saves the states of a running set of processes. The encapsulation of an appshot 220 allows the on-demand system 140 to replicate an application and provide a plurality of instances of the same application to be operated at substantially the same time utilizing a plurality of subsets of the on-demand computational resources. The replication allows the on-demand system 140, among other things, to move the appshot 220 to another set of compute resources such as another server, computer or machine, to duplicate the appshot 220 to other servers, and to replace or upgrade an appshot 220. Further, the encapsulated appshot 220 allows the on-demand system 140 to put an application when operating as an instance of an application into a form which allows the system to remove the instance of the application from an idle server when the application instance associated with an appshot 220 is not being used, and to store the appshot 220 in a memory with accompanying application states. As an example, an appshot 220 is an already running application halted at a point in time. Thus the on-demand system is capable of freeing up resources to allow other applications to utilize the idle resources.

In one embodiment, the on-demand application system 140 is capable of relocating or replicating an appshot 220 to other or alternate sets of computational resources such as other compute modules and/or other edgepoints 350 (see FIG. 14A) distributed throughout the worldwide on-demand system 140 providing at least a portion of the distributed on demand computational resources. In one embodiment, an edgepoint 350 is a computing facility with intelligent routing and load balancing architecture or capabilities. The edgepoint is capable of operating as a server. An edgepoint includes at least one and usually a plurality of servers or processors, such as a Sun Server 420 available from Sun Microsystems, Windows NT server from Microsoft, and a Linux server available from Linux, and substantially any other conventional server known in the art. The edgepoints are deployed, in one embodiment, throughout the world making up at least a portion of the on-demand system 140. Application providers will generate an appshot 220 of the application, applications or site which they want to distribute throughout the on-demand system 140. The appshot 220 can then be distributed to specific edgepoints, or distributed globally to every edgepoint 350 of the on-demand system 140. Thus, when an entity 124, such as a user, a separate application, a server, a process, computational device and substantially any other entity capable of issuing requests for application processing, wants to access the application or site, the edgepoint 350 activates or restores the appshot 220 to an activate instance of the application or applications encapsulated within the appshot 220. The configuration and structure of the appshot 220 also allows the edgepoint 350 to re-encapsulate or snapshot the application or applications back into an appshot 220 and store the appshot 220 in a memory when the application or applications are not in use. As discussed above, the appshot 220 is capable of being restored or reactivated when needed. In one embodiment, the application can be restored from an appshot 220, usually in less than 5 seconds, and more usually less than 3 seconds, depending on the available edgepoint resources. Thus, in one embodiment, the on-demand system 140 provides capacity on demand by restoring an appshot 220 when needed to provide one or more instances of an application. The system monitors the resources utilized to provide processing for the active application instances. The application provider is then charged according to the amount of computational resources utilized in providing users with access to their distributed applications.

Figure 11:
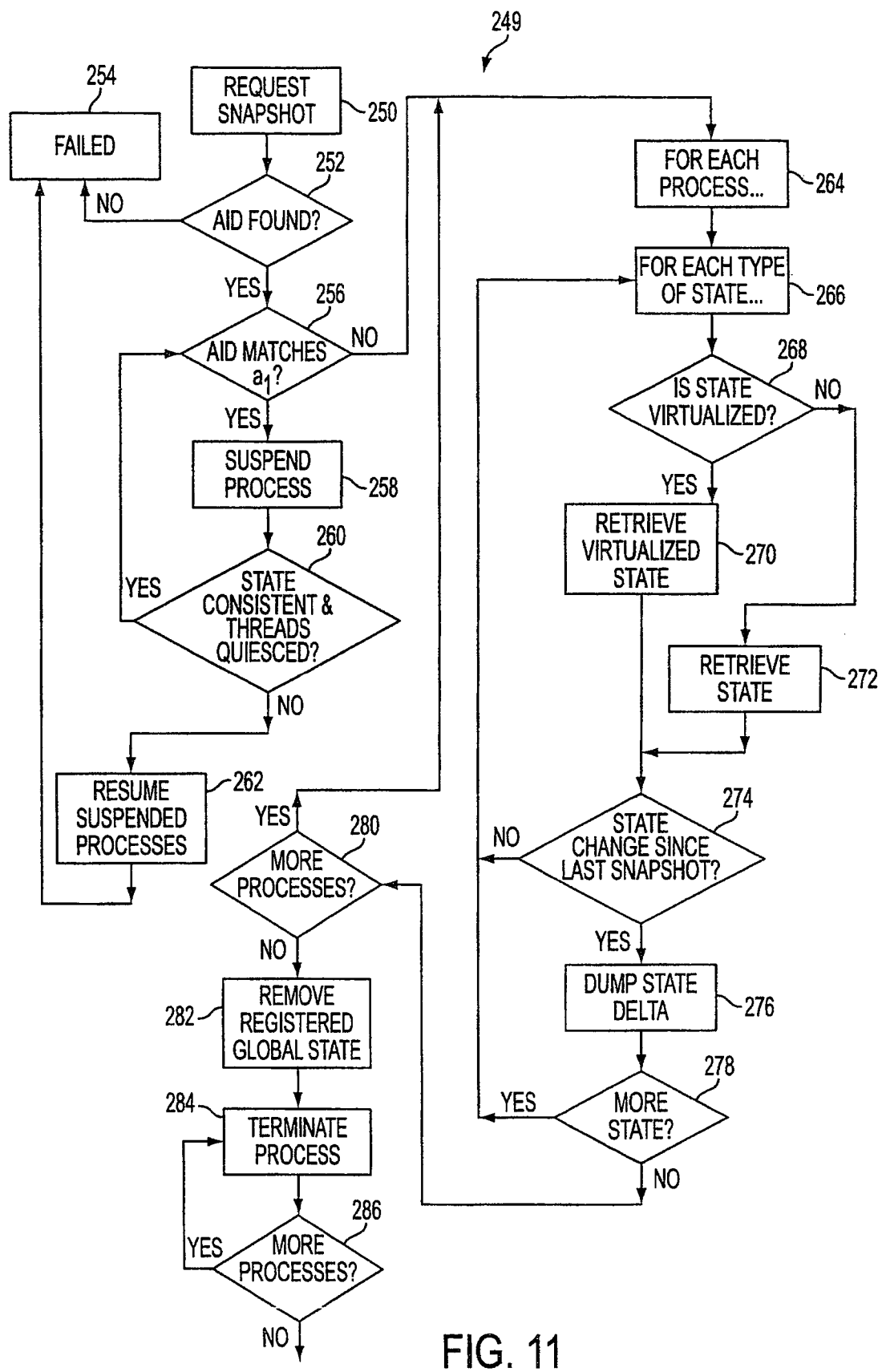
FIG. 11 depicts a simplified flow diagram of one implementation of a sequence of steps executed by the present invention to perform a snapshot of a process or application instance.

FIG. 11 depicts a simplified flow diagram of one implementation of a sequence of steps executed by the present invention to perform a snapshot of a process or application instance. In step 250, a snapshot of an active application is requested. The processes that are snapshotted together in the form of an application chain share the same application ID (AID). As such, the AID is looked up (decision step 252) in memory containing a list of the AID's present. If the AID is not found control returns at step 254. However, if the AID is found, control continues to decision step 256 where a search is performed for a process belonging to the application having the matched AID. If a process is found, control continues to step 258, where the process is suspended. If the state is consistent and the threads are quiesced (decision step 260), control loops to step 256 and the remaining processes belonging to the application are located and suspended. However, if a process is located that does not have a consistent state or a thread is not quiesced, suspended processes are resumed and the snapd module 262 returns a notice that the snapshot was not completed.

In one embodiment, a snapd module (snapshot daemon module) comprises a daemon listening on a port that does the snap-shotting of all processes that have the same snapshot id (snapid). The state of the applications after a snapshot is taken is stored in one or more files. The state that is typically saved includes process state information (for example, in a snapshot file per process), and memory information (for example, in a file per anonymous and shared memory segments). In one embodiment, the snapshot file stores all process state information as a pseudo ELF file. A different ELF_NOTE section is created for each process state record (such as file descriptor). Another file called snaplist.snapid identifies all the processes in that snapid along with any parent/child relationship. In one embodiment, the process state information is collected during execution in preload libraries or when the snapshotting is done from the kernel.

Once the related processes are suspended, the states of the suspended processes are checked to see if they are virtualized (step 268). A virtualized state is any process state that reflects a visualized resource. If the state is virtualized, it is retrieved at step 270 otherwise the non-virtualized state is retrieved at step 272. If the state has changed since the last snapshot (step 274), the new state is recorded. Control then loops to step 266 and executes through the above sequence of steps until the states of the processes are checked. Once completed, control proceeds to step 282, registered global states, such as semaphores, are removed. A registered global state is a state that is not specifically associated with any one process (i.e., private state). A global state is usually exported (accessible) to all processes and its state can be modified (shared) by all processes. Control proceeds to step 284, where the process is terminated. If there are remaining processes (step 286), these are also terminated. This sequence of steps is concluded to create a snapshot of an application instance which is stored, in one embodiment, as a file and made available for reactivation or transmission to another compute modules, and/or other edgepoints.

Figure 12:
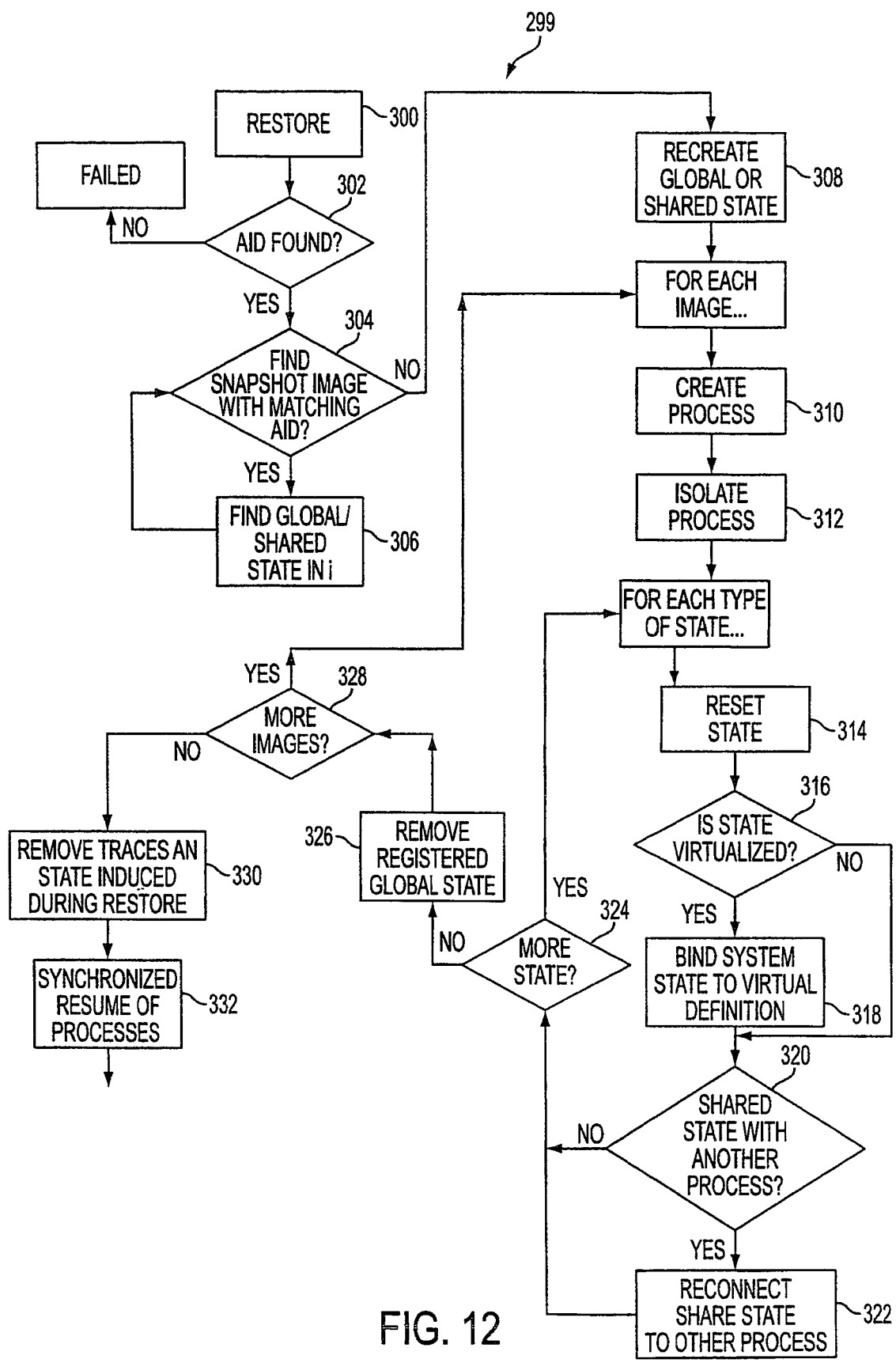
FIG. 12 illustrates a simplified flow diagram of one implementation of the sequence of steps executed to restore a snapshotted application.

FIG. 12 illustrates a simplified flow diagram of one implementation of the sequence of steps executed to restore a snapshotted application. The snapshotted application is accessed via a shared storage mechanism through a restore call at step 300. The AID for the snapshotted application is looked up and (decision step 302) if not found a notification is issued that the snapshotted application has not been restored. However, if the AID is found, control continues to decision step 304 where, if the snapshotted application matching the AID is located, the global/shared state for each process associated with the snapshot are found. Control then continues to step 308, where remaining global or shared state for the processes are recreated. Then a process is created that inherits the global/shared state restored in step 308, and the created processes are isolated to prevent inter-process state changes. At step 314, for each type of state within the processes, the process-private resources are recreated to their state at the time the application was snapshotted. If the state is virtualized (decision step 316), the system state is bound to a virtual definition. In one embodiment, as part of the restore a step is performed to create a virtual mapping. This is done by taking the system resource that was created in step 314 and binding it to the virtual definition that was saved during the snapshot in step 266. This allows the application to see a consistent view of resources, since it may not be guaranteed that at restore time the same system resource will be available. If the state is shared with another process, such as via a pipe (decision state 320), the shared state is reconnected with the other process at step 322. If there are more states (decision step 324) steps 314 through 322 are repeated. Once steps 314 through 322 have been executed for all states, control continues to step 326, where the process is placed in synchronized wait. If there are remaining images in the snapshotted application (decision step 328), steps 310 through 326 are repeated. Once all images have been processed, control continues to step 330, where traces and states induced during restore of the process are removed, and a synchronized operation of the processes occurs at step 332. Once steps 300 through 332 have executed without error, the restored application can continue to run without interruption. Thus, the present invention avoids the overhead and delay of shutting down an application, storing data to a separate file, moving both the application and data file elsewhere, and restarting the program or application.

Figure 13A:
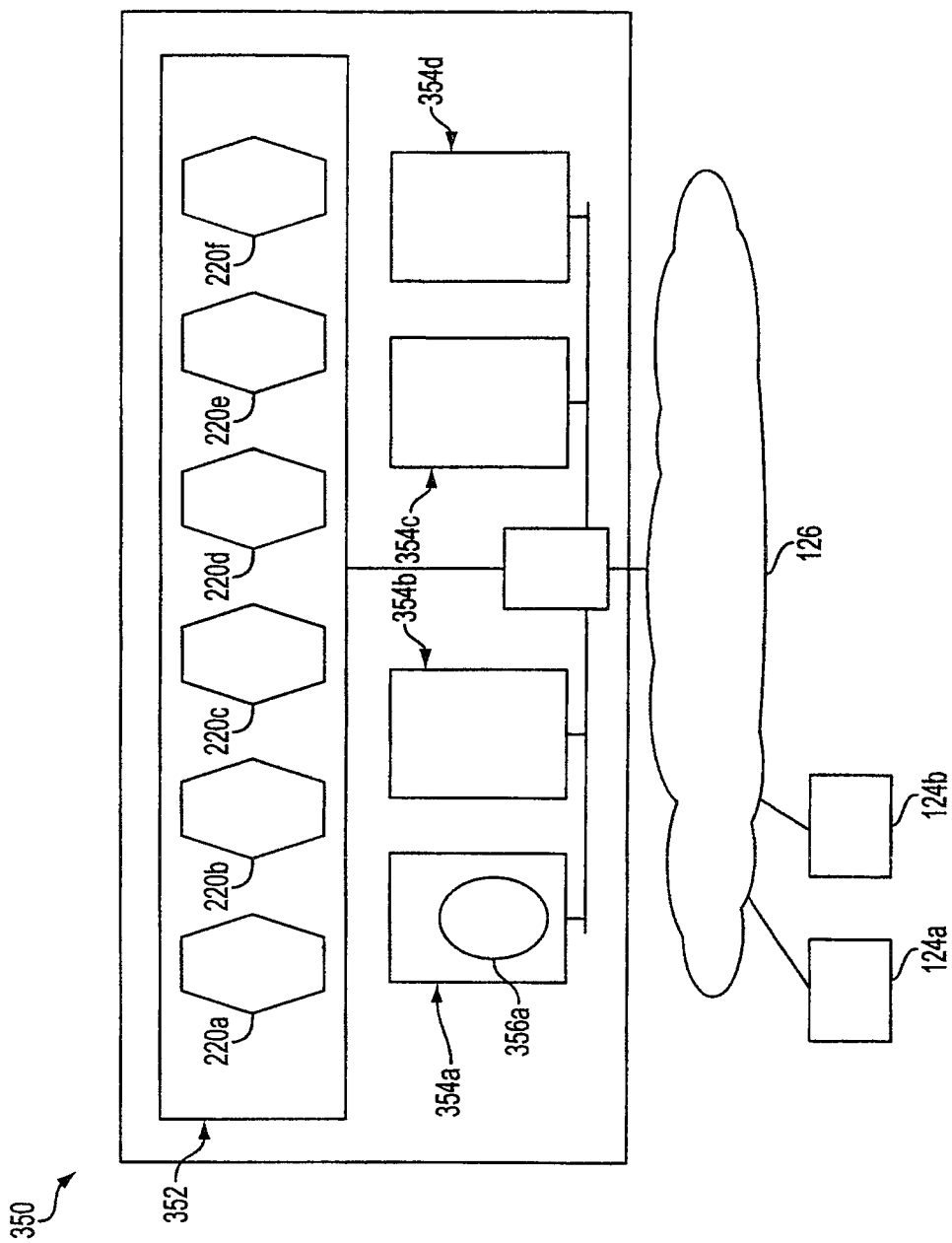
FIGS. 13A-C shows a simplified block diagram of one embodiment of an edgepoint of the present invention.
Figure 13B:
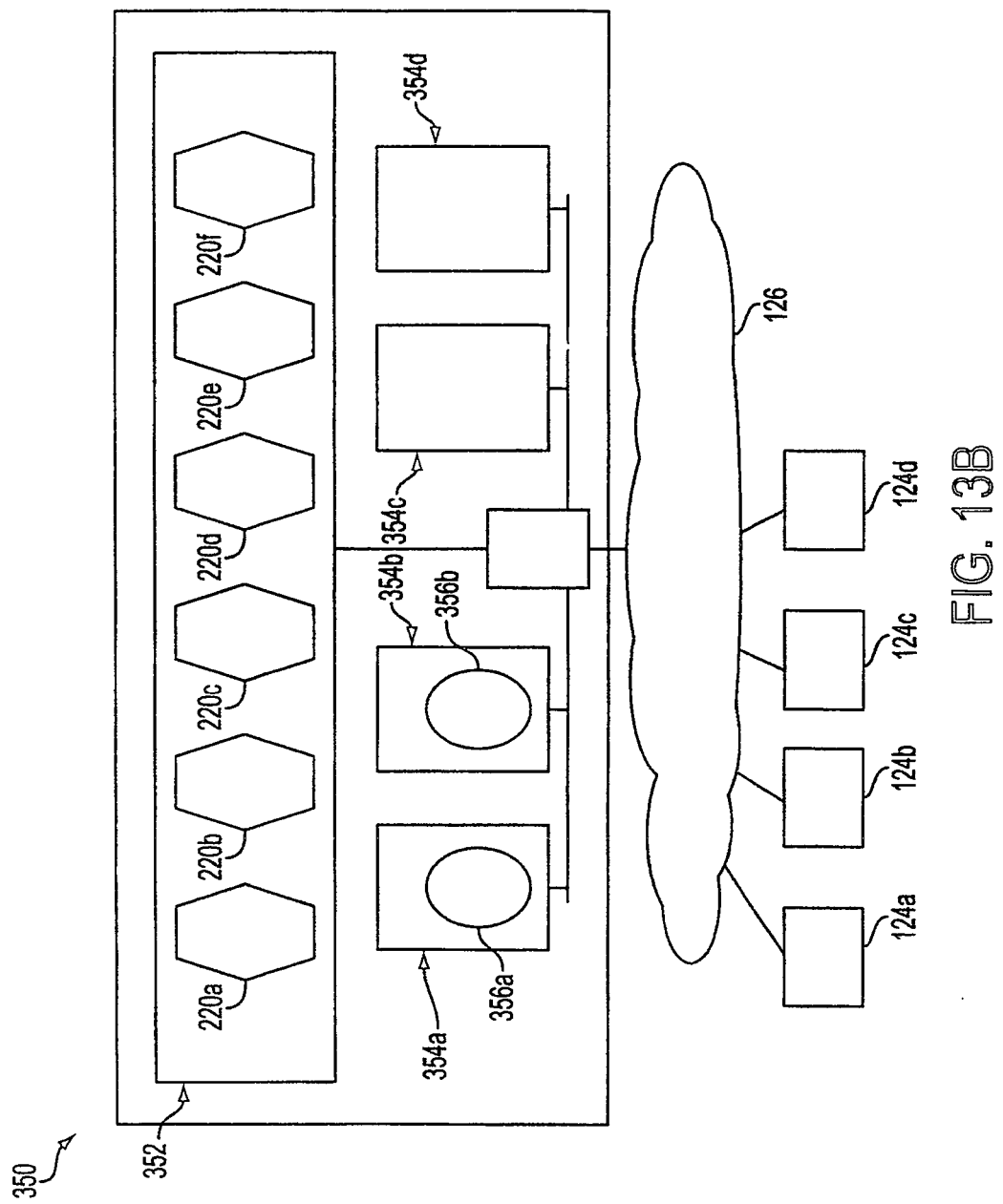
Figure 13C:
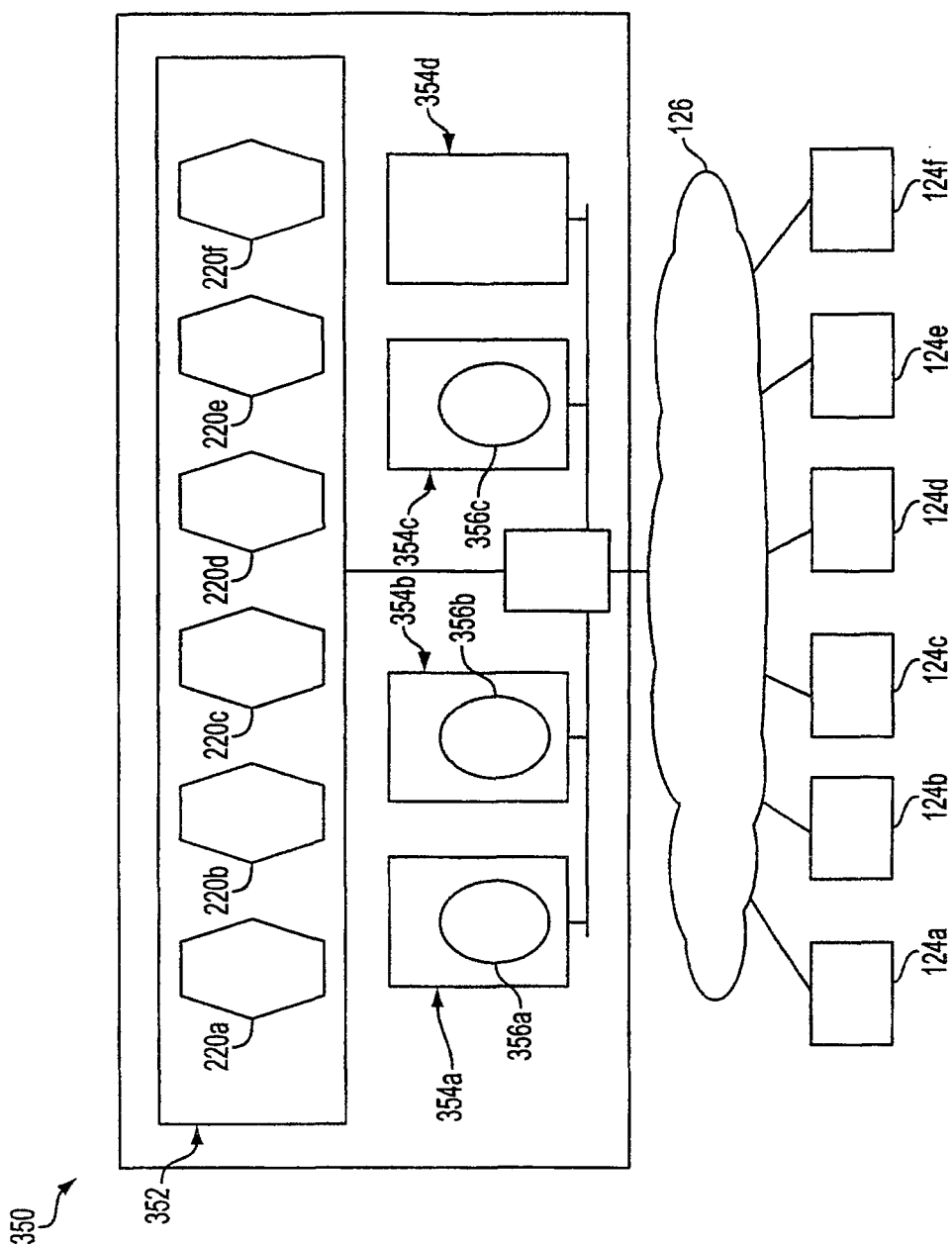

FIGS. 13A-C depict one implementation of one embodiment of the system and method or process for providing on-demand compute resources provided by the present invention.

FIG. 13A shows a simplified block diagram of one embodiment of an edgepoint 350 of the present invention. The edgepoint 350 includes a memory 352, which is any type or combination of memory including fast semiconductor memory (e.g., RAM or ROM), slower magnetic memory (e.g., hard disk storage), optical memory substantially and any conventional memory known in the art. Within memory 352 is stored appshots 220a-f. Edgepoint 350 further includes compute resources 354. Compute resources include but are limited to at least one of a microprocessor, memory, control logic, or combination thereof. In operation, the edgepoint 350 is accessed by at least one entity, such as users 124a-b, over a network, such as the internet 126. When a user 124a is routed to the edgepoint 350 and requests one or more applications, the edgepoint 350 determines which appshot 220a-f provides the desired application. The edgepoint pulls or duplicates the appshot 220b from a halted or snapshotted state, and unencapsulates or restores the appshot 220b onto a first set of compute resources, such as a first server 354a. The server 354a activates an instance of the application 356a to allow the user 124a to utilize the application 356a. In one embodiment, the edgepoint 350 restores an application from an appshot 220 immediately upon request.

Referring to FIG. 13B, once a server 354a is running the application instance 356a, the application 356a is fully active and operating, so that additional users 124b can be routed to and gain access to the active application 356a. Because the application 356a is already active, additional users 124b get an immediate response with substantially no delay. However, as more users request access to the application 356a, the response time begins to suffer, and the effectiveness of this application begins to deteriorate because the application 356a becomes overloaded. As additional users 124c attempt to access the instance of the application 356a response time degrades. In one embodiment, a predetermined response time threshold or limit is set, or a predefined number of users is set which limits the number of users allowed to access one instance of an application. Thus, when a new user 124c attempts to access the application 356a, and this new user 124c exceeds the predefined threshold, the edgepoint 350 activates the appshot 220b to initiate a second instance of the application 356b. Thus, this demonstrates the ability of the present invention to provide capacity on the run or on-demand, and provide an optimal response time for the applications 356a-f.

Referring to FIG. 13C, as the numbers of users accessing the second instance of the application 356b continues to increase, the threshold will once again be reached. Once additional users 124e attempting to access the second instance of the application 356b exceeds the limit, the edgepoint 350 will again activate the appshot 220b to activate a third instance of the application 356c. This will continue until the servers 354a-f are occupied to capacity running at least one of the applications 356a-f. At which point, the edgepoint 350 will signal the system 140 and the on-demand application system 140 will then direct or route additional users to other edgepoints 350 throughout the distributed on-demand system 140. Thus, the system 140 ensures an effective response time and reliability, and thus improves user satisfaction.

The present invention also provides for the freeing up of system resources to be utilized by alternative applications. As the number of users 124 decrease below a threshold, one of the application instances, such as the third instance 356c, can be terminated or snapshotted to free up a set of resources. The freed resources allows the edgepoint 350 to activate and run an alternative appshot 220a-f. Thus, the on-demand system 140 not only provides resources but reduces resources when not needed, result ing in a reduced cost to the application provider. Further, the present inventive on-demand method and system 140 provides for the ability to share resources among application providers because applications can be initiated as well as removed from compute resources allowing a substantially unlimited number of applications to utilize the same resources.

In one embodiment the edgepoint 350 is not limited to activating a single application 356 from a single appshot 220. A single edgepoint 350 can activate a plurality of different applications 356 on a variety of different sets of compute resources, such as servers 354, based on the applications requested by the users 124.

In prior art systems, application providers wishing to provide applications had to buy a server, then they must buy or develop the applications that are going to be loaded and run on that server, load the server, and activate the server to provide access to that application. The server is a fully dedicated resource, so that 100% of the time an application is dedicated to a specific server. The present on-demand application system 140 reverses or switches this paradigm and instead of applications being dedicated to a server, the on-demand system 140 provides computing resources on-demand, when demand for an application is received, and additionally frees up resources when demand falls off for the restoring of completely different applications. Further, application providers no longer need to purchase the servers. Application providers simply take advantage of the on-demand application processing system 140 already deployed by loading their applications onto the distributed on-demand system 140. The on-demand system 140 allows an application provider to allow substantially an unlimited number of users to access substantially the same application at substantially the same time without over loading the system 140 or the application, all without the need to incur the extremely expensive capital expense of providing their own system. Instead, the application provider pays for the amount of resources utilized to provide their users access to the applications. As demand increase, the on-demand system 140 increases the number of applications running, increasing the amount of compute resources and capacity, thus the application provider is charged more; as demand falls, the on-demand system 140 decreases the number of application instances, reducing the amount of computational capacity, thus the application provider is charged less. Thus, the application provider is charged for the amount of resources used.

In one embodiment, the present invention provides for a distributed on-demand system 140 such that potentially thousands of servers 354 in hundreds of edgepoints 350 are globally deployed and linked to create a virtual single server view throughout the world. This virtual single server view provides an application provider with access and control over their own applications in the system 140.

Figure 14A:
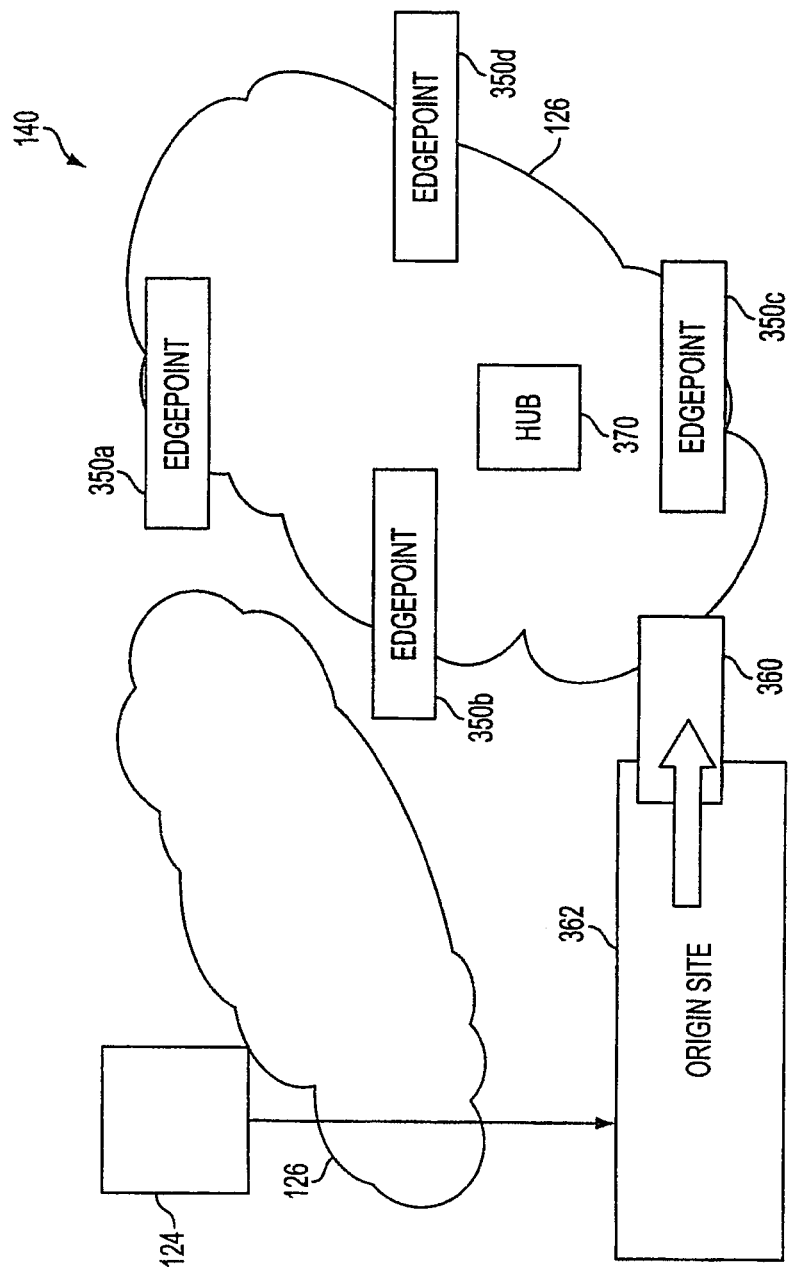
FIGS. 14A-C show simplified block diagrams of embodiments of the present on-demand application processing system in cooperation with the preexisting internet infrastructure.
Figure 14B:
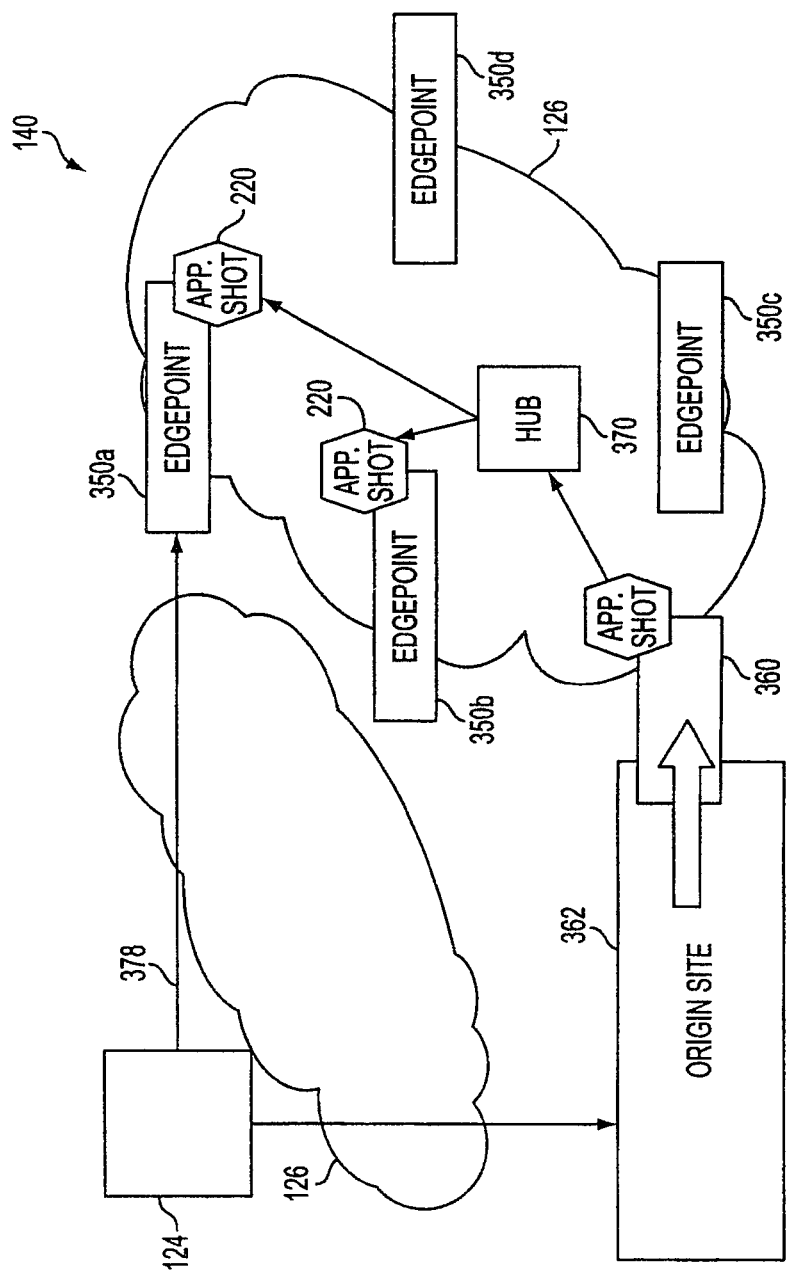
Figure 14C:
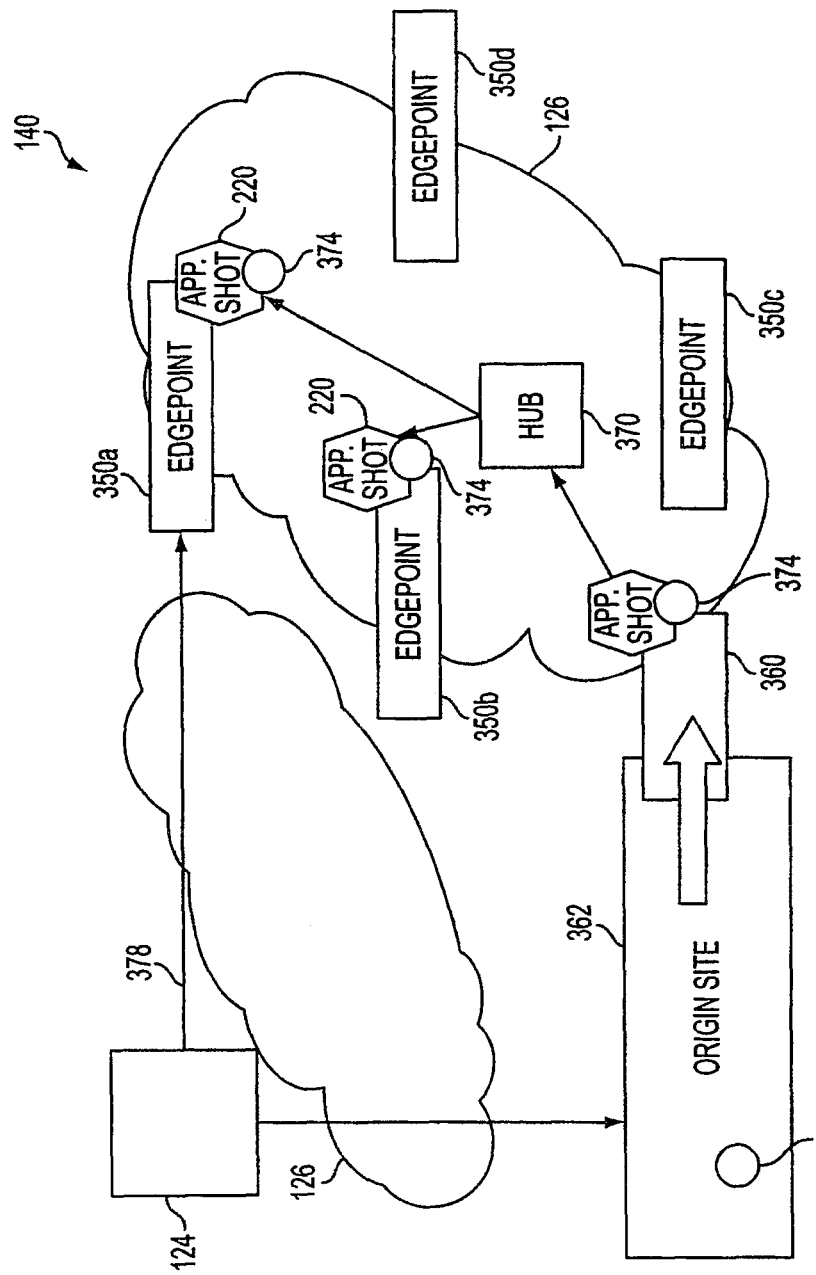

FIG. 14A-C show one implementation of one embodiment of the novel method and system 140 which allows the application providers to dictate the distribution of their applications, the potential compute resources to be available, upgrade or alter their applications, replace applications, monitor applications, and monitor the amount of resources utilized by entities accessing their distributed applications.

Prior art application processing systems require an application provider to route a user to a single central site to allow access to the applications. Every user attempting to access the application is directed to the single central site. Thus, result ing in the bottle neck as discussed above. In the prior art single server or single central site, the application provider, however, does maintain access to and control over the application.

In some systems where the application provider outsources their server capacity, the application provider must select from a preselected, limited number of applications. Further, the application provider no longer has direct control over the application. Any changes desired by the application provider are submitted by request to the server provider. Then the server provider must schedule a time at low demands to take the server down to make the changes. This process results in large lag times between the decision to make changes and the implementation of those changes.

FIG. 14A shows a simplified block diagram of one embodiment of the present on-demand application processing system 140 in cooperation with the preexisting internet infrastructure 126. The present distributed on-demand application processing method and system 140 provides for distributed processing capabilities, with on-demand capacity, as well as providing the application provider with direct access to the on-demand system 140 and thus direct access and control over their applications. The application provider has control to distribute new applications or change already distributed applications throughout the on-demand system 140. In one embodiment, the on-demand system 140 is configured to provide an application provider with a virtual single server view of the on-demand system 140. This virtual single server view allows an application provider complete access and control over the applications which the application provider decides to distribute over the system 140. In one embodiment, the system 140 provides an application provider with the ability to deploy applications throughout the distributed on-demand system 140, change and update deployed applications, and monitor any one or all of the applications deployed throughout the internet 126 from a single terminal or site. In one embodiment, the application provider can deploy or access their applications through any one of a plurality of terminals or locations, including computers located at their own facilities. The present on-demand system 140 provides the application provider with the ability to deploy applications and access those applications once distributed through the system 140. As referred to herein, conduit 360 is a staging facility that enables the application provider to deploy applications across a computer network. Through the conduit 360 application provider deploys applications, retains control over their deployed applications, monitors the operation of their applications on the system 140, checks billing information, checks metering information, checks performance information, and so forth.

By structuring the on-demand system 140 as a single distributed system, and allowing the application provider with access to the on-demand system 140 through a single point, the on-demand system 140 appears to the application provider as a single server. Thus, when the application provider wishes to load and implement a new application onto the system 140, the application provider simply accesses the on-demand system 140 through conduit 360. Still referring to FIG. 14A, in one embodiment, application provider is capable of loading an application as an appshot 220 onto the on-demand system 140 from a single origin site 362 through the conduit 360. The application provider loads the appshot 220 onto the system 140. The application provider is then capable of designating specific locations (for example, areas of the world wide system 140, such as, edgepoints 350a and 350b representing Asia, Western Europe, the United States, Germany, a north-eastern portion of the United States, or London) or the entire system to allow users to access the deployed applications. Once the areas of distribution are designated, the on-demand system 140 distributes the appshot 220 through a hub 370 to the edgepoints 350 in the areas designated by the application provider. FIG. 14B shows a simplified block diagram of one embodiment of the on-demand system 140 with the appshot 220 distributed to edgepoints 350*a* and 350*b*. Once the appshot 222 is distributed, a user 124 can then be routed 378 to the most optimal edgepoint 350*a* having the specified application, instead of being routed to the central site 362. Because the on-demand system 140 is configured to appear as a single virtual server, the application provider loads the appshot 222 once on to the system 140. The application provider does not need to load the application onto each edgepoint to distribute the application to specific areas of the on-demand system 140 or throughout the system 140.

Further, the virtual single server mechanism also allows the application provider access to the appshot 220 through conduit 360 from a single point in the on-demand system 140. Referring to FIG. 14C, the application provider is capable of making changes or up-grading 374 the appshot 220 through conduit 360 and/or replacing the appshot. In one embodiment, the change or up-grade 374 is made once. This change or up-grade 374 is then distributed throughout the system to those edgepoints 350*a-b* providing the desired application without additional input from the application provider. Thus, the application providers maintain control over their applications and how the applications are distributed. The application providers are further capable of directly implementing changes and updates and replacements to their applications.

Figure 15B:
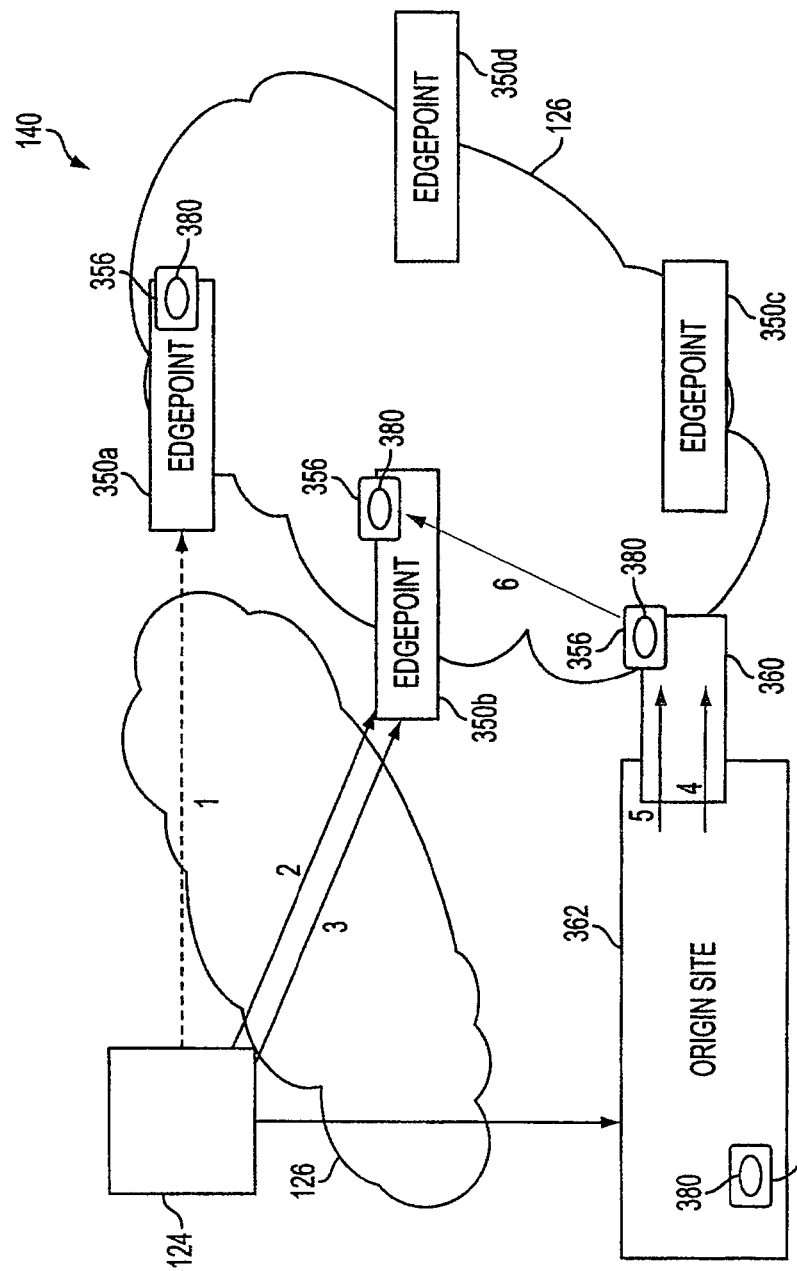
Figure 15C:
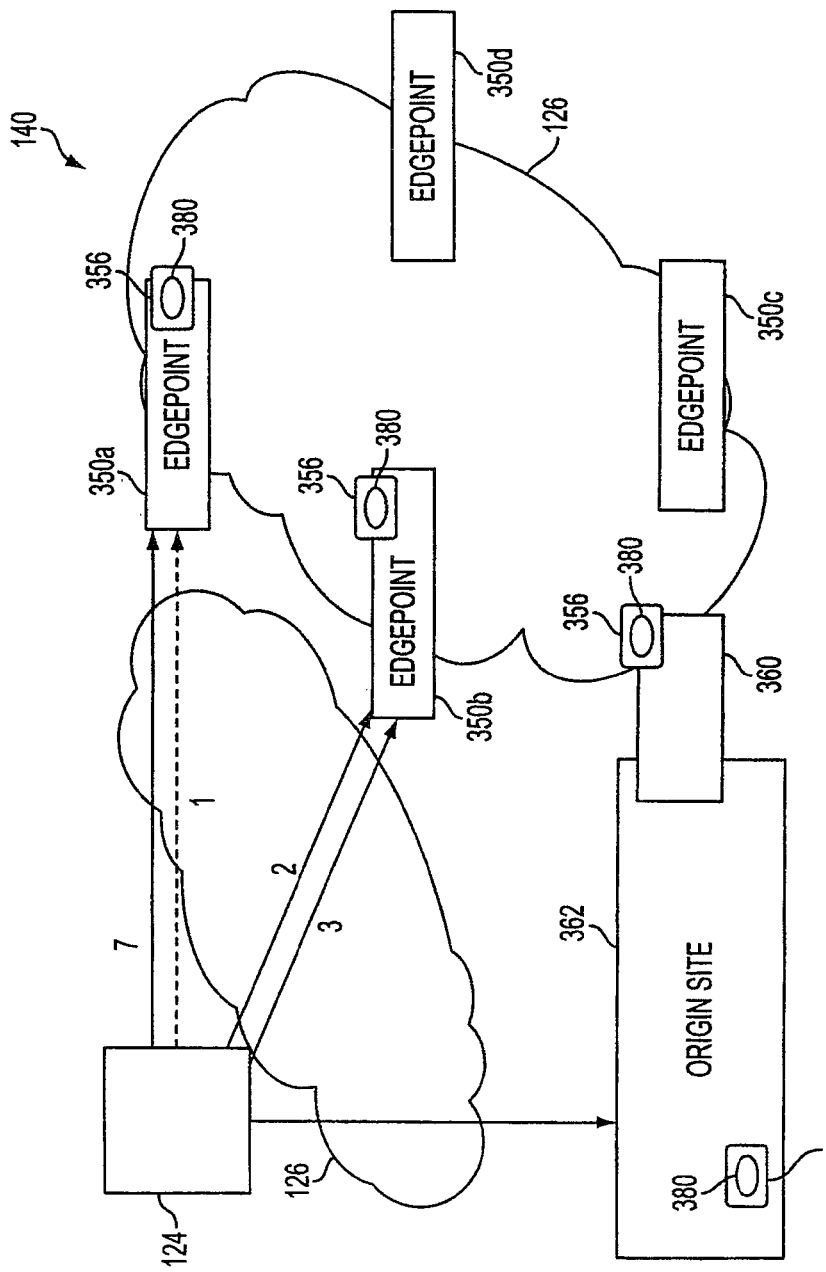

FIGS. 15A-C show a simplified block diagram of one implementation of one embodiment of the optimal user and entity routing provided by the present invention. FIG. 15A shows a block diagram of one embodiment of the on-demand application processing system 140. One of the advantages of the on-demand system 140 and virtual single server mechanism is the ability to route a user 124 to an optimal edgepoint 350 which will provide the user 124 with the least amount of latency delays while avoiding overloading a single edgepoint 350. For example, referring to FIG. 15A, to reduce the amount of latency delay, it would be preferable to route the user 124 to the geographically closest edgepoint 350*a*, as designated by dashed line 1. However, because of an overriding condition, for example edgepoint 350 is overloaded by other users, the user 124 is routed to a second edgepoint 350*b*, as designated by arrow 2, adding a minimal amount of latency delay but providing enhanced response time because the second edgepoint 350*b* is not as heavily loaded, thus providing an overall superior interaction.

Referring to FIG. 15B, another advantage of the on-demand system 140 is that the applications 356 can be interactive. Thus allowing the user 124 to make changes or additions 380 to the information provided through the application 356. Further, once changes are made to the application 356, the on-demand system 140 will continue to route the user 124 to that same edgepoint 350*b*, as designated by arrow 3, for future connections of that user 124 to the on-demand system 140 for that application 356. This affinity for that user 124 ensure that the user 124 continues to interact with the most current version of the application 356 according to the user's information and changes. The on-demand system 140 also provides the capability to synchronize or update the system 140 to reflect the changes 380 made by the user 124. The updates are made at anytime as dictated by the on-demand system 140, such as periodically, randomly or by schedule. As shown in FIG. 15B, the changes 380 made by the user 124 are forwarded to the origin site 362 through conduit 360, as shown with reference to arrows 4 and 5 updating the origin site. In one embodiment, the on-demand system 140 is further capable of distributing the changes 380 to the other edgepoints 350*a* which provide access to the application 356, shown by arrow 6. Thus, the on-demand system 140 synchronizes data and user's changes 380 throughout the system, maintaining an active and current system, without further interaction by the application provider. Examples of user changes include changes to a user profile, items added to a shopping cart, and other such changes. One example of data changes from the application provider would be an online catalog update from the application provider to the various edgepoints. Referring to FIG. 15C, once the on-demand system 140 is updated and the user's changes 380 are distributed throughout the on-demand system 140, the on-demand system 140 is again free to re-route or route the user 124 for future connections to any optimal edgepoint 350 in the system 140 providing the needed application 356, as noted by arrow 7. Thus, the present on-demand method and system 140 provides affinity in the routing scheme along with the ability to synchronize the on-demand system 140.

Some of the additional features and benefits provided by the novel on-demand application processing method and system 140 include edge staging and load testing of applications and sites. The on-demand system 140 allows application providers to directly install new versions of a website or application onto the system 140. The system 140 allows the application provider to limit the access to the new application or website. Thus, application providers are able to access the new website or application and functionally test the distributed site or application. Further, the on-demand system 140 allows the application provider to load test the application or site prior to allowing public access and use. For example, utilizing the on-demand system resources, numerous synthetic simultaneous sessions are able to be activated at a single time to load test the application or site. The application provider is able to perform these load tests without the capital expenditure of having to purchase additional equipment to perform load testing. Further, because of the pricing scheme of the present on-demand method, the application provider then pays for the amount of capacity utilized during this testing. Which is significantly less expensive than purchasing additional equipment.

Figure 16:
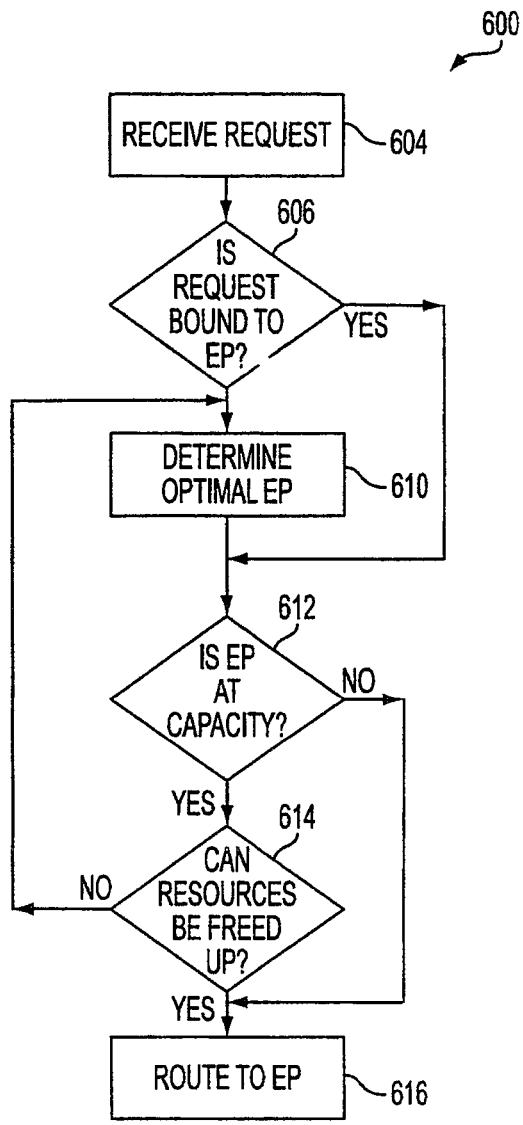
FIG. 16 shows a simplified flow diagram of one implementation of one embodiment of the method and system providing on-demand compute resources.

FIG. 16 shows a simplified flow diagram of one implementation of one embodiment of the process or method 600 and system providing on-demand computing resources. In step 604, an application request is received from an entity. Once a request is received, the process 600 enters step 606 where it is determined if the request from the entity is bound to a specific compute resource, such as a specific edgepoint. If the request is not bound, step 610 is entered where the optimal edgepoint is determine for providing the compute resources for application processing. In one embodiment, the optimal edgepoint is determined based on a plurality of criteria, including minimal latency delay, capacity of the edgepoint, the distribution of the desired application across the network, and other such parameters. Step 612 is entered if, in step 606, the request is bound or once the optimal edgepoint is determined in step 610. In step 612 it is determined if the bound or optimal edgepoint is operating at capacity. If the edgepoint is operating at capacity, step 614 is entered where it is determined whether the edgepoint can free up sufficient resources by snapshotting one or more application instances. If resources cannot be freed up, the process 600 returns to step 610 to reevaluate and determine the optimal edgepoint. Step 616 is entered, if in step 612, it is determined that the edgepoint is not at capacity, or in step 614 it is determined that capacity can be freed up on the edgepoint. In step 616, the user is routed to the edgepoint where the edgepoint determines optimal routing of the user to an instance of the desired application.

Figure 17:
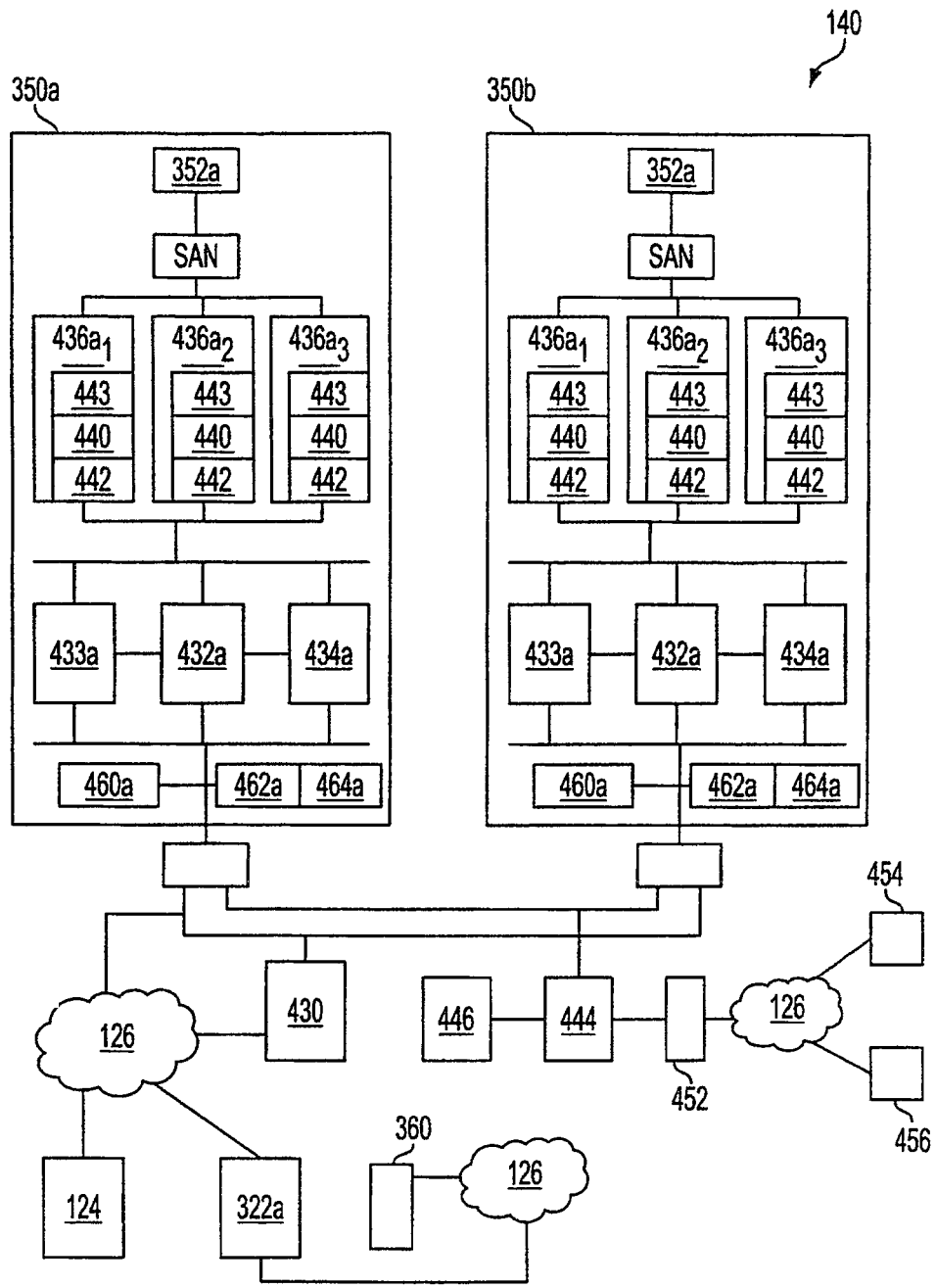
FIG. 17 shows a simplified block diagram of one implementation of one embodiment of a novel on-demand apparatus including a plurality of edgepoints.

FIG. 17 shows a simplified block diagram of one implementation of one embodiment of a the on-demand apparatus 140 including a plurality of edgepoints 350a-b. The network 140 can include substantially any number of edgepoints. FIG. 17 depicts two edgepoints for simplicity, however, it will be apparent to one skilled in the art that the network 140 can include substantially an unlimited number of edgepoints. Network 140 is configured to at least provide application processing for remote users 124 over the internet 126. Network 140 can include any number of edgepoints allowing the computational capacity of network 140 to be scaled. Network 140 provides user 124 with differential computational capacity through either of the edgepoints 380a-b. In one embodiment, network 140 includes a global dispatcher (GD) 430 which at least provides routing of application requests from user 124 to an edgepoint of the network. Based on network parameters including, but not limited to, edgepoint load and which applications are currently provisioned on each edgepoint 380a-b, GD 430 routes the user to the optimal edgepoint, for example first edgepoint 380a. Once the first edgepoint 380a receives the user request, the request is accepted and dispatched by a local dispatcher 434a. A resource manager 432a determines which of a plurality of compute resources or modules $436a_1$-$436a_3$ would be the optimal compute module in which to route the application request. In determining the optimal compute module, the resource manager 432a determines if a compute module is currently running the desired application or whether the application needs to be restored from a snapshotted state. The resource manager further determines if compute resources need to be freed up. If resources need to be freed, the resource manager signals a snapd module 440 of the optimal compute module, where the snapd module snapshots one or more application instances, thus freeing up the resources which were associated with the snapshotted applications. Once the optimal compute module has the available resources, the resource manager 432a signals the optimal compute module, for example first compute module $436a_1$, where the restored module 442 restores the desired application from memory 352a if necessary, and initializes the application to allow the user to interact with or operate the desired application.

In one embodiment, restored is a daemon that restores the state of all processes that belong to a single snapid. Snaplist identifies the list of processes that need to be restored. In one embodiment, the restore program "morphs" into the target process. The restore program creates processes in the order determined by, for example, a parent/child relationship. Each restore program is designated a process-id (pid) that it morphs to and each will do so by reading the appropriate snapshot file.

In one embodiment, the resource manager 432 further monitors the compute resources utilized by each application instance and records the compute resources utilized. The on-demand system 140 uses the recorded resource utilization for determining the amount an application provider is charged for the use of the compute resources. In one embodiment, the system includes a monitoring module 464, which monitors the compute resources and provides the monitored results to the resource manager and other components of the system. In one embodiment, the resource manager (RM) utilizes the perfd module to collect at least some of the data to determine the amount of resources utilized per application instance. The resource manager 432 monitors such things as CPU utilization, network bandwidth, disk utilization, license usage, response time latencies, and other such parameters for determining resource utilization.

In one embodiment, a perfd module comprises an agent or other entity running on the computer node (CN) that computes or otherwise determines the performance of each of the CNs. A call to this perfd agent is initiated by the resource manager (RM). This perfd agent makes system calls to collect the statistics and sends it to resource manager. Viewed somewhat differently, perfd is or includes a daemon or other mechanism that collects performance information, hence the abbreviation perfd for performance daemon. In a more general way, a perfd module is any performance determining module In one embodiment, a compute node is a component within an embodiment of an edgepoint that runs the components of an Application Instance. Typically, these are application tiers such as a webserver connected to a middle-tier and a database. In one embodiment, an edgepoint is a machine or collection of machines that run the customers site. An administrative node (AN) is the component within an edgepoint that runs the administrative components of an edgepoint. For example, a configuration database, deployer components, data synchronization components, and monitoring components are run in the administrative or admin node.

In one embodiment, the network 140 further includes at least one deployment center 444, deployment database (DDB) 446, conduit 360, and dashboard (i.e., a network operating center (NOC) dashboard 454 and/or a customer dashboard 456). In one embodiment, the edgepoints further include a global dispatch module 460, a data synchronization module 462 and the metering module 464. The plurality of edgepoints communicate such that snapshotted instances of applications can be transferred and users rerouted.

The global dispatch module 460 provides communication with and access to the network 140, and aids in network routing to allow entities, such as users 124, access to the applications and compute resources. The global dispatch module 460 further receives information from the network and other edgepoints regarding the amount of compute resources available on other edgepoints 350 and throughout the network 140 to aid in optimizing the resources of the network. The data synchronization module 462 communicates with the network to receive data and information from the network to update the edgepoint 350 with the data. The data synchronization module 462 allows new or changed data distributed across the network to be forwarded to the compute modules 436 and/or the memory 352 of the edgepoint 350. In one embodiment, the data synchronization module 462 allows data added or changed by a user 124 to be distributed across the network 140. The metering module 464 monitors the edgepoint and the compute resources utilized by an application, user, group of applications, and any combination thereof. The metering module 464 acts in cooperation with the resource manager 432 to monitor the compute modules 436 and collects data from the compute modules regarding usage. In one embodiment, the metering module is further configured to determine an amount to charge the application providers based on the amount of compute resources utilized by each application provider for application processing.

In one embodiment, the deployment center 444 acts as the hub that collects data, policies and applications and distributes them to the edgepoints 350a-b. Deployment center 444 maintains application and data versions and distributes updates, revisions and replacements which are forwarded to the deploy modules 433a-b of the edgepoints 350a-b. In one embodiment, the deployment through the deployment center 444 includes capturing application states (initial and updates), policies and testing methods as released to the network 140 from application providers and network administrators and moving it to the edgepoints 350a-b. The policies include deployment and execution policies. Application states include the actual application data/binaries and the method to create the snapshots.

In one embodiment, the DDB 446 is the repository for the NOC 452 and serves also as the repository for deployment by the deployment center 444. Conduit 360 provides an application provider with access to the network 140 to distribute, update and monitor their applications distributed throughout the edgepoints 350*a-b*. In one embodiment, the conduit 360 abstracts or virtualizes the distributed nature of the network 140 and allows the application provider to update, manage and view their data and applications without being burdened by the location and load of the actual edgepoints 350*a-b*.

In one embodiment, the dashboards provide at least two forms of data viewing, including immediate and aggregated. Immediate viewing allows a current, up-to-date view of an entity of the network 140, such as edgepoints 350*a-b*, global dispatcher 430, deployment center 444 and conduit 360. In one embodiment, immediate viewing is updated on a predefined schedule, periodically when a predefined change occurs or upon request. Aggregated viewing provides a cumulative temporal view of the entities of the network 140, such as application instance usage, user patterns, edgepoint usage, etc. In one embodiment, immediate views are obtained by polling the edgepoints 350*a-b* and conduits 360. The aggregate view is accumulated at the deployment center 444. In one embodiment, dashboards receive resource utilization information and determine an amount to charge each application provider based on the amount of resources utilized.

The NOC dashboard 454 allows network operators and controllers of network 140 to gain access to and view information and data relating to components on the network 140. In one embodiment, NOC dashboard 454 allows access to components on the network at machine levels and application instance levels.

Customer dashboards 456 allow application providers to view the state of their outsourced applications, such as response time, data arrival rates, comp-utilities used, amount of compute resources utilized, cost per application, and other such information. In one embodiment, the network 140 prevents customer dashboards to gain access to the actual edgepoints 350*a-b* and the applications stored and operated by the edgepoints 350*a-b*.

In one embodiment, network 140 includes additional dashboards which allow other operators and users of the network access to information on and about the network. One example of an additional dashboard is an independent software vendor (ISV) dashboard which allows ISV's to view the usage patterns of applications on a per application provider or per application basis. This is an audit for the ISV's to understand how their applications are behaving in a real environment.

Figures 18, 19:
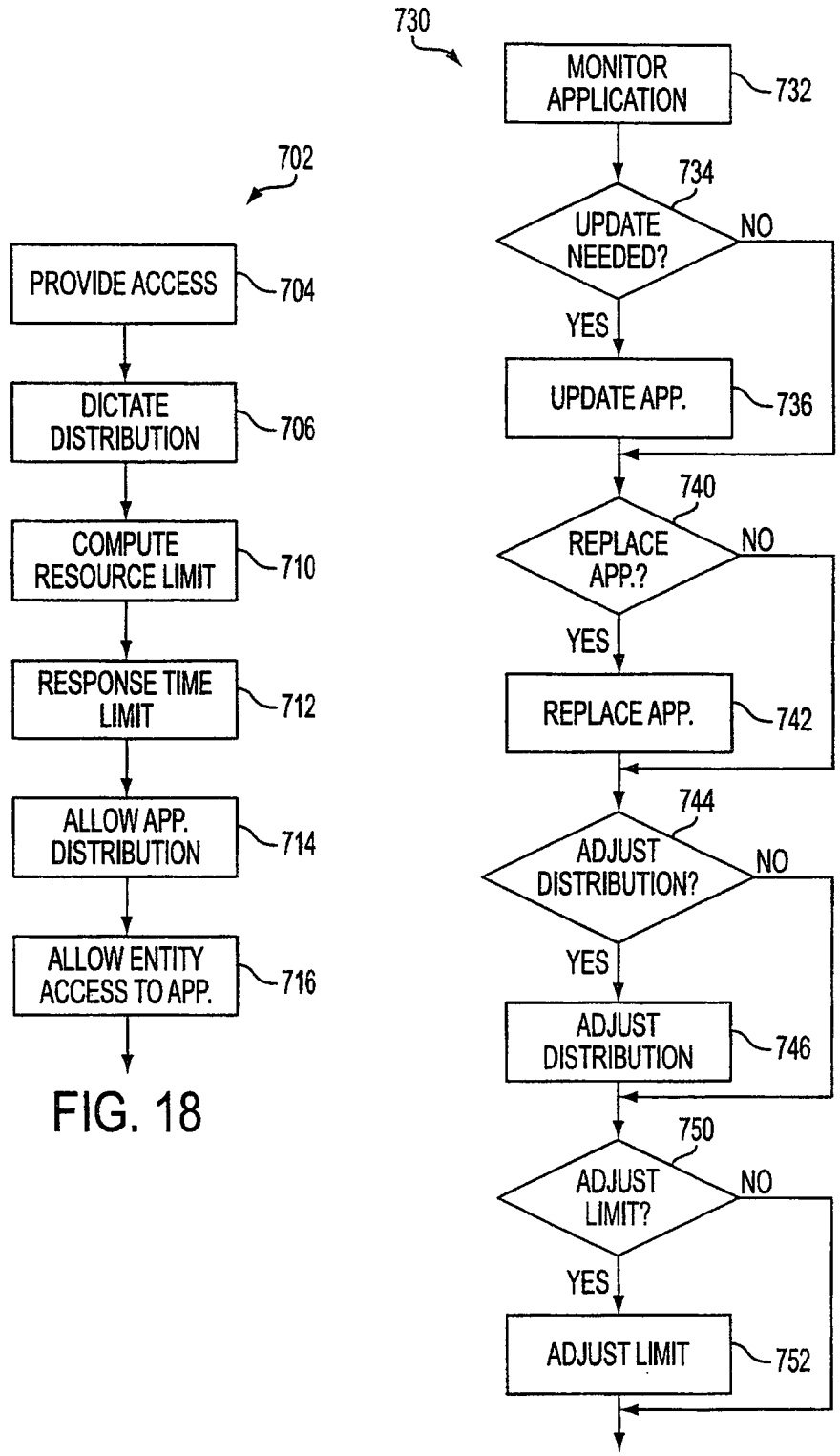
FIG. 18 depicts a simplified flow diagram of a process for an application provider to access and distribute applications onto the distributed, application processing system of the present invention.
FIG. 19 depicts a simplified flow diagram of one embodiment of a process for an application provider to monitor and update applications distributed onto the system.

FIG. 18 depicts a simplified flow diagram of one implementation of one embodiment of a process 702 for an application provider to access and distributing applications onto the distributed system 140. In step 704, the application provider gains access to the system 140. In one embodiment, the application provider gains access through conduit 360. In step 706 the application provider dictates to the system the distribution of the application being deployed. As discussed above, the application provider is capable of limiting the distribution to specific geographic locations, to specific markets, to populated areas (such as only to resources located near metropolitan areas) and other such deployment distribution. The application provider can also allow an application to be distributed across the entire system 140. In step 710, the application provider specifies limits on the amount of compute resources to be utilized. The limit may be based on a monitory limit or other limits. In step 712, the application provider dictates a maximum response time, such that when demand is such that the response time is exceeded, the system 140 will activate additional instances of a desired application. In step 714, the application is distributed. In step 716, entities, such as users, servers and computers are allowed to access the distributed applications.

FIG. 19 depicts a simplified flow diagram of one embodiment of a process 730 for an application provider to monitor and update applications distributed onto the system 140. In step 732, the application provider monitors the applications distributed. In one embodiment, the application provider is capable of monitoring the system through the dashboards 456 and conduit 360. In step 734, it is determined whether the application provider wishes to update or change the distributed application or applications. If updates are to be made, step 736 is entered where the application provider submits the updates and the updates are distributed. If, in step 734, updates are not to be made, or following updates, it is determined in step 740 whether the application provider wishes to replace a distributed application. If yes, then step 742 is entered where the application provider submits the replacement application and the replacement application is distributed. If, in step 740, no replacement is needed, step 744 is entered where it is determined whether the application provider wishes to adjust the distribution of one or more application. If the adjustments are received and the adjustments to distribution are made in step 746. If adjustments are not needed, step 750 is entered where it is determined if the application provider wishes to adjust resource limits, such as response time limits, monetary limits, capacity limits and other such limits. If yes the adjustments are received and implemented in step 752.

Figure 20:
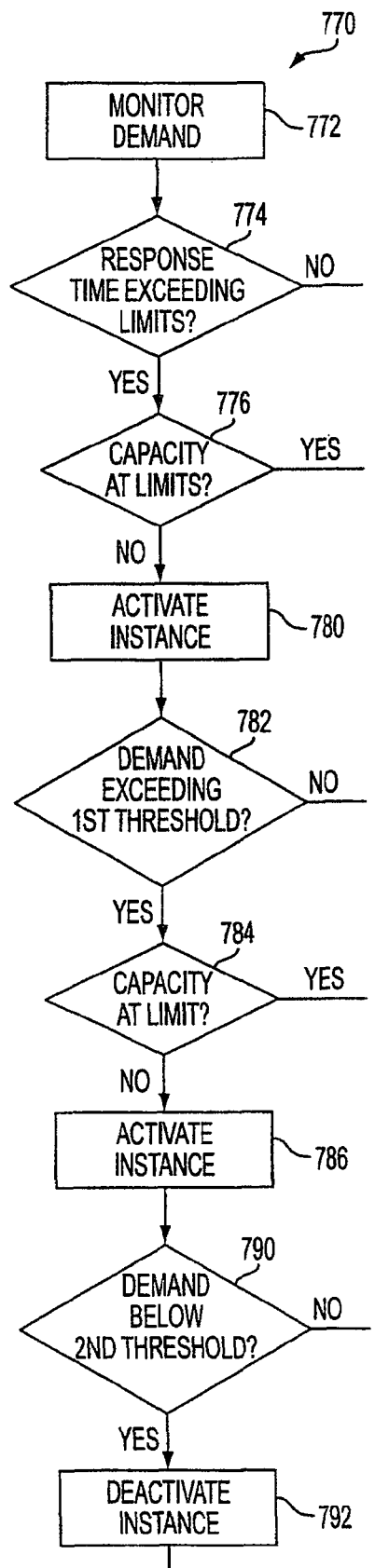
FIG. 20 depicts a flow diagram of one embodiment of a process for monitoring demand and determining an amount to bill an application provider.

FIG. 20 depicts a flow diagram of one embodiment of a process 770 for monitoring demand and determining an amount to bill an application provider. In step 772, the on-demand system 140 monitors the demand for each application distributed on the system. In step 774, it is determined whether the response time for an application exceeds limits. In one embodiment, the limits are default limits. In one embodiment the limits are previously specified by the application provider. If the response time limits are exceeded, the system determines if the system is at capacity, where capacity is dictated by several factors including, but not limited to compute resource availability, resource limits specified by the application provider, and other such factors. If the system is not at capacity, step 780 is entered where a new instance is restored where an instance of the application is restored and activated to allow entities to access the application. In step 782, it is determined if demand exceeds a first threshold, where the threshold is defined as a number of users per instance or other such parameters. The threshold is a default threshold or defined by the application provider. If the demand exceed the first threshold, then step 784 is entered where it is determined if the system is at capacity (as described above). If the system is not at capacity then step 786 is entered where an instance of a desired application is activated to allow entities to continue to access the application without exceeding the threshold. In step 790 it is determined whether the demand is below a second threshold. If the demand is below the second threshold, at least one instance of an application will be snapshotted in step 792 to free up resources and reduce the compute resource cost to the application provider.

Figure 21:
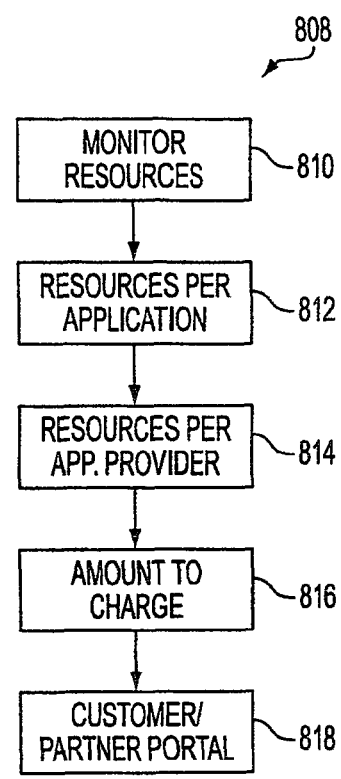
FIG. 21 depicts a simplified flow diagram of one implementation of one embodiment of a process for determining an amount of resources utilized for an application and the amount to be charged to the application provider based on the amount of resources utilized.

FIG. 21 depicts a simplified flow diagram of one implementation of one embodiment of a process 808 for determining an amount of resources utilized for an application and the amount to be charged to the application provider based on the amount of resources utilized. In step 810, the compute resources providing application processing is monitored. In step 812, the amount of resources utilized by each distributed application is determined. In step 814, a total amount of resources utilized by each individual application provider all applications distributed by each application provider is determined. In step 816, an amount to charge each application provider is determined based on the amount of compute resources utilized in application processing of all application distributed by each application provider. In step 818, the metered data is presented via a portal to application providers and partners (such as resellers and independent software vendors).

The capability to meter resource usage creates the further ability to develop pricing schemes which reflect the economic value or cost of providing service, including, for example, the opportunity cost of using compute resources for a given application. As an example, demand for computing resources during the business day may be higher than demand for processing during the night. The system provides a mechanism for pricing for peak usage versus off-peak usage.

The system facilitates a transfer pricing mechanism for computing resources. By metering resources used on an application level, the system enables a compute resource provider to determine how much resource usage is related to each specific application or customer. In one embodiment, this enables a corporation to allocate the cost of a centralized computing resource between different departments according to usage.

In one embodiment, more than one party may own the compute resources within the distributed network. In this case, the present invention enables the trading of compute resources between any number of compute resource suppliers and users. For example, a party may be an owner of compute resources that in the normal course of events provide sufficient capacity for its processing needs. This party can, by deploying the present invention and interconnecting its computing network with those of others, sell underutilized computing resources, and buy compute resources from other parties at times of peak demand. This enables parties to significantly improve the utilization of their computing infrastructure.

In the more general case, the present invention enables the development of an efficient market for trading computing resources, facilitating economic pricing. By way of example, a spot market could develop, better reflecting supply and demand of computing resources. Instruments for managing the financial risk of fluctuations in price on the spot market could then develop, for example forward contracts, options and derivatives.

In one embodiment, the novel system 140 is configured to provide at least six data paths including: a data path that connects an entity 124 to an application instance at an edgepoint 380; a data path that sets up application instances for application providers; a data path which implements the snapshot/restore framework; a data path which provides a centralized view of edgepoints to application providers, the network provider and other such entities for monitoring the edgepoints and the compute resources utilized; a data path which provides database and file updates; and a path which prepares an application or plurality of applications for deployment and data synchronization.

As discussed above, the edgepoint 350 is capable of performing a plurality of actions or functions based on parameter and compute resource utilization information collected, such as performing snapshots of active application instances; restoring applications based on demand, response time and other parameters; effecting a move of an application instance; identifying optimal compute resources, such as an optimal compute module for routing a request; monitoring the performance and available capacity of the edgepoint to optimize performance and to signal the global dispatcher 430 when the edgepoint is operating at or near capacity; and monitoring the compute resources utilized per application instance such that the application provider is charged for the resources utilized in operating the application provider's distributed applications.

In one embodiment, the edgepoint 350 effects moves of application instances based on the results of an overload of a compute module, under-utilization of another compute module, and/or prioritization of one application instance over another (based for example, on distribution and prioritization specified by the system provider and the application providers).

The edgepoint 350 determines if the edgepoint is overloaded and hence notifies the global dispatcher 430 such that bind requests are re-routed back to the global dispatcher or initially routed by the global dispatcher to alternative edgepoints. In one embodiment, the resource manager 432 sends periodic load or resource utilization messages to the global dispatcher, such that the global dispatcher can accommodate the server weighting in the databases and memory.

The edgepoint further monitors, meters, and/or collects resource consumption information from application instances. This information is used by the dashboards 454, 456 and for billing. In one embodiment, the information that is collected is logged into the databases or memory. The information collected by the edgepoint includes, but is not limited to, CPU usage, memory usage, disk usage, network bandwidth usage on a per application instance basis. In the case of CPU usage, information is collected at the software component level, providing a greater level of granulating than prior art systems. This information may be used to identify and allocate resources, manage partnerships and for usage based billing purposes.

The edgepoint additionally collects performance information such as application response time. In one embodiment, for each application instance, the resource manager 432 performs a periodic response time check. This information is also used to initiate the snapshot or move actions.

In one embodiment, the conduit 360 allows an application provider to create and distribute one or more application onto the network 140 producing the outsourced applications. The conduit performs a plurality of function including, but not limited to: determining cleave points; capturing distributed applications and associated data; capturing distribution policy, response time policy and other such policies as designated by the application provider; and test captures.

Cleaving includes a process of dividing one or more applications into applications that are distributed across the on-demand network 140, and applications that are not to be distributed, and instead, for example, maintained by the application provider. One example is a website, where the site is cleaved to allow some of the application processing of the site to be handled by the distributed on-demand network, and some of the application processing of the site to be handled by the central site of the application provider. Thus, cleaving separates the applications that are outsourced by the application provider to be distributed over the present invention to take advantage of the on-demand compute resources.

The novel on-demand network 140 acquires and captures the applications and data associated with those applications through a capture process. The capture process analyzes how to bring up the necessary applications associated with a request, such as all the applications in a website operated from the on-demand system. The capture process further collects files and database data files for the application instances to satisfy a request. The capture process maps applications to application instances and documents the process of capturing the process of creating an application instance, and maps data to an application instance for data synchronization and captures.

In one embodiment, application and data capture is a process for determining how an outsourced application is constructed or produced. Some of the steps for application and data capture include:

a) analyzing how to bring up applications in the network, such as bringing up applications configured to produce a web site;

b) collecting the files and database datafiles for the operation of application instances;

c) mapping applications to application instances and documenting the process of creating an application instance. In one embodiment, this is predominantly the data used by a packager (not shown) for initial deployment, and the instructions to start and stop application instances; and d) mapping data to an application instance, data synchronization and capturing the data synchronization components.

In one embodiment, the application provider dictates the distribution of the applications onto the distributed, on-demand network 140. The application provider is capable of designating specific geographic areas for distribution, high traffic areas, such as specific metropolitan areas, and other such distribution. The application provider is also capable of designating the quantity of distribution, which will allow the application provider to limit the cost by limiting the compute resources utilized based on the distribution designation.

Policy capturing includes collecting deployment and execution policies. Deployment policies determine coverage information and are used by the deployment center 444 to aid in selecting the edgepoints 350 that will hold the outsourced applications. Execution policies relate to user-level SLAs and priorities for execution. Policy capture allows the application provider to limit and determine the potential cost spent by the application provider in utilizing the on-demand network.

In one embodiment, the on-demand network 140 is further capable of providing capacity testing of applications to aid the application provider to determine the accurate and operational capacity of application. One example is the testing of the capacity of a web site before allowing users to access the web site. Test capture includes a method, data and frequency to run tests on edgepoints before enabling the applications.

In one embodiment, the conduit 360 includes a studio module (not shown) which is a module used to perform application/data, policy and test captures in the conduit. The studio module includes at least six functional modules, including: a catalog module (not shown) which creates an inventory of deployed application; a camera module (not shown) which is the portion of the studio used to capture the process of bringing up and/or restoring an application, and establishing an initial snapshot; a packager module (not shown) configured to assemble an installed application and snapshots into a format (package) suitable for deployment; a publisher module (not shown) capable of transferring the packaged application to a deployment center; a cleaver module (not shown) which identifies the portions that are handled by the outsourced applications, and will initiate data synchronization; and a policy editor module (not shown) configured to specify deployment policies. Application strength, deployment coverage and level of service are specified through the policy editor module. In one embodiment, the coverage is coarsely defined as a number of application instances, a number of edgepoints and/or which geographic location or locations. A level of service is also coarsely defined as a response time of an application.

The on-demand method and system 140 further provides remote control capabilities. The remote control feature provides: policy-based server management with the alignment to business objectives; deployment policies with application provider's selection of coverage, along with deployment and initiation timing; resource use policy to aid in obtaining the desired response time within application provider's budget constraints; and web-based policy editor.

Another advantage of the novel on-demand method and system 140 is providing application providers with direct access to the system 140 and allowing the application provider to make immediate changes or version updates to existing applications or site. Further, application providers are able to immediately load completely new applications or sites onto the system 140 without the need to bring the application or site down.

Another advantage of the present method and system 140 is the ability to provide fast rollback. Because of the design of the system 140 and ability to maintain applications in an inactive or snapshotted state as an appshot 220, prior versions of applications can be maintained on the edgepoints 350 while new versions are loaded onto the edgepoints 350. If there is a glitch or error in the new version, the system 140 is able to quickly redirect the system 140 to reinstate the old version. Thus, avoiding catastrophic errors and glitches.

Another advantage provided by the novel on-demand method and system 140 is the ability to distribute users 124 to applications 356 throughout the system 140 thus spreading the load of the users. This provides the application provider with additional benefits which were not available through the prior art without enormous capital expenditures. One benefit of the on-demand system 140 is the ability to handle extremely large numbers of entities 124 at a single time because entities can be directed to application instances distributed throughout the system 140. As an example, application and web providers have the ability to announce and broadcast an event which may attract abnormally large numbers of users without overloading the system. Because the users can be routed to edgepoints all over the system 140, the maximum load on any given edgepoint will not exceed the capacity of the resources of the edgepoints. Thus allowing abnormally large numbers of entities to utilize or view the application or website. This is all achieved without the need for the application provider to purchase large numbers of servers and accompanying hardware, as well as the need to configure, load and maintain these large numbers of machines for such a limited surge in user load.

An additional benefit is that application providers are able to interact with abnormally large numbers of users instead of just broadcast to those users. Because the applications are distributed, the capacity to operate those applications is also distributed. Thus, allowing each instance of an application to utilize a larger amount of resources without exhausting the resources of the system. Thus, more interactive applications and sites are capable without the need for additional capital expenditures by the application provider. These are significant advantages provided by embodiments of the invention that are not available in conventional content delivery systems, networks, or methods.

As an example, big media companies have the capability through the present on-demand method and system 140 to now start getting a one to one opportunity with users accessing their applications and sites. As a comparison, television allows the distribution of a single program without any interaction. However, with the present method and system 140, a plurality of different programs can be distributed while allowing direct interaction with the user without overloading a system and without cost prohibitive capital expenditures. As a further example, if a prior art application or site were to get a million and a half simultaneous "views" of an event, there is no way, with prior art systems, to turn those "views" immediately into a million and a half purchases or registrations or any other interaction because a computer system large enough to handle that amount of a load at a single site would be too cost prohibitive. But with the present on-demand method and system 140, the million and a half load is distributed throughout the world wide system of data centers, each housing a plurality edgepoints. Thus, instead of a single server or machine handling a million and a half simultaneous hits, the load is distributed across hundreds of edgepoints and/or servers, which results in thousands or less simultaneous hits per edgepoint 350. A load of tens of thousands of simultaneous hits is manageable for a single server or machine. Thus, the benefits of distributing loads becomes apparent through the scalable, on-demand capacity provided by the present system 140.

A further advantage of the present on-demand method and system is that the user maintains control over their own applications and websites which are deployed over the on-demand system. In prior art systems, the application provider owns their own servers, allowing the application provider with complete control over the application or site. The application provider knows exactly what is being provided. Further, the application provider has direct access to the single server allowing the application provider the ability to monitor the application, the load of the application or site, and the types of interaction occurring with the application or site. However, the prior art systems require the large up-front capital expenditure to initiate and maintain the servers. Further, the prior art systems have either too much capacity and thus wasted capital expenditure, or too little capacity and thus unsatisfied users.

In one embodiment, the present on-demand method and system 140 is designed to allow the application provider with direct control and access to their applications. With the added benefit of being able to monitor specific regions, the application provider has the ability to adjust their applications or websites according to feedback received from a specified region to more accurately address the needs and desires of users in that region by simply adjusting the instances of the appshot housed in edgepoints in those regions of interest. Further, the application provider is able to fully monitor the application. In one embodiment, this is achieved by allowing application providers to create different applications to be deployed geographically as desired. In one embodiment, the on-demand method and system includes: a web-based performance portal to allow the application provider comprehensive statistics on the virtual single server with the additional benefit of obtaining further web response time metrics; alerts based on set bands of acceptable performance; and expense monitoring based on the amount of resources used by the application provider including daily web-based bill review, and alerting of faster-than-expected spending.

Some of the safety precautions or security architecture provided by the novel on-demand method and system 140 are discussed below. The security architecture ensures that edgepoints run registered appshots 220 to prevent hackers from starting other applications; appshots 220 do not allow login, SetUserID, and other such conditions to prevent hackers from breaking out of the appshot control; appshots 220 access limited disk storage, memory, sockets and other such resources to protect user data; the conduit 360 and hub 324 authenticate each other before transfers of data or appshots; appshots 220 are compressed and encrypted when transferred from the conduit 360 to the edgepoints 350; administration is authenticated and changes are audited. The system 140 also prevents denial-of-service attacks because of the size of the distributed on-demand system 140 and the number of edgepoints 350.

In one embodiment, the present on-demand method and system 140 utilizes links from other applications, such as application provider's home or central web site, to route the user 124 to the desired application 356 stored and maintained on an edgepoint. The system allows an application provider to outsource only a portion of their applications to the on-demand system 140, while still maintaining some of their application processing. For example, an application provider may outsource some of the applications to operate a web site, but, the application provider's central site is still maintained by the application provider. In an alternative embodiment, an application provider outsources their entire application suite and sites, including their central site, to the on-demand system 140. In one embodiment, the link or pointer from the central site points to a site maintained and controlled by the application provider, but is stored and operated from the resources of the on-demand system 140. When the link or pointer is activated, the on-demand system 140 is accessed and the user 124 is routed to the most optimal edgepoint providing the application desired. In one embodiment, the optimal edgepoint is determined based on network latency and edgepoint load. If the loading on a first edgepoint 350a is too great, the system will route the user 124 to a second edgepoint 350b even though the second edgepoint 350b maybe a further distance way from the user 124 than the first edgepoint 350a. This rerouting is performed because it is worth taking additional latency delays along the routed path to get to the second edgepoint 350b because the second edgepoint 350b is under less load or stress and will provide a superior response, result ing in a superior response even with the added latency delay.

The present on-demand method and system 140 not only provides on-demand, distributed application processing, the on-demand method and system 140 also provides shared resources throughout the distributed on-demand system 140. In one embodiment, because of the unique ability to store an application in a snapshotted state, the present invention is also capable of removing an application from resources when the application is not being actively used, thus freeing up the resources. This allows an alternative application to be activated on those resources. Thus providing on-demand, distributed application processing through shared resources which reduces the cost of the resources because a plurality of application providers are utilizing the same resources. In one embodiment, the present invention provides for the ability to return an application not being used into a snapshotted state to free up resources for other applications to utilize. Further, in one embodiment, when an active application is returned to a snapshotted state freeing up resources, the application provider is no longer charged for the resources that the application was utilizing. The application provider pays for the amount of resources which are actually used by applications distributed by the application provider. The amount of consumed resources are measured in a variety of different ways including: the amount of processor usage; the amount of memory usage; the number of processors operating; the amount of network bandwidth usage; the number of appshots deployed; the density of appshot deployment; and any combination thereof.

Prior art or conventional systems and methods have been developed which distribute content to allow local routing of users. However, these conventional systems and methods do not provide for a method of communicating or returning processed information back to the main site. Prior art outsourced content providers do not provide for processing capabilities of the application providers specific applications. The present invention provides for the separation of applications, the outsourcing of those applications to distribute the load utilizing distributed resources allowing superior performance, without limiting the functions or processing of the applications.

In one embodiment, the present on-demand method and system 140 provides for the scheduling of website or applications to servers and/or resources. The inventive method and system are dynamic and real-time or near-real time. This scheduling of resources is an inversion of the prior-art paradigm of requiring an application to be dedicated to a single server. Typical prior-art systems are configured such that applications are implemented to run on fixed machines or servers. When a request to access an application comes in to a prior art system, the request gets routed to a waiting server. Therefore, the applications on such systems must be active at all times because requests cannot be predicted. Because these applications are fixed or tied to the machine or server, the prior-art server must also be kept running all the time.

The present method and system 140 provides for the dynamic scheduling of a website or application to be processed on demand by restoring an appshot to its running state. Thus, an application can be shut down or removed from server resources until a request for that application is issued. A snapshotted application 220 can be loaded from a shared memory into a server and accompanying resources in less than approximately five seconds and more usually in less than about three seconds, activating what was an idle server. These times are guidelines and not limitations. Thus, the present method and system 140 allows for instant activation of the application on substantially any chosen compute resource. Further, when the application is no longer being used, the present method and system 140 provides the capability to halt the application to free up the resources for another application. Therefore, the system 140 is able to provide economies of scale and favorable pricing to application providers. Attempting to try and achieve this capability through prior art systems is completely impractical because of the amount of time needed to take down an entire application to free up a server and resources along with the amount of time needed to install and activate a new application is completely prohibitive. Thus the present method and system 140 allows for the dynamic scheduling of applications to be processed on demand on optimal compute resources by restoring an appshot to its running state which reverses the paradigm of dedicating servers to applications. Batch processing is therefore well supported The on-demand network 140 provides the capability of handling more applications per CPU, computer, microprocessor and/or processor than is available through prior art computers, systems or networks by over provisioning the number of applications that are provided by the edgepoint and time multiplexing the use of these applications. In part, this is a result of the "bursting" nature of demand. This is achieved through the unique snapshot/restore ability of the network and edgepoint. Prior art systems cannot provide this capability because of the amount of time needed to take down an application and activate anew application, as well as the loss of data and current state information associated with an application at the time it is taken down. The system 140 provides for the unique ability to quickly halt an application, and store the application and associated states. The halting of the application is achieved without adversely affecting the application or adversely affecting the operation of the application when the application is reactivated or restored for operation. By snapshotting an application, the edgepoint frees up the set of resources for an alternative application. Thus, the edgepoint can multiplex the access and operation of applications without adversely affecting the operation of the application, and without the application and user's knowledge.

In one embodiment, the on-demand method and system 140 is application oriented as apposed to process oriented. The on-demand method and system 140 provides for a virtualization layer in the operating system, such that an application is considered the object of interest, instead of considering the processes as the object of interest. Thus allowing the freezing or halting of an application, and the storage of the application stack, including the different processes, their interprocess communication and its state.

By enabling an application oriented processing network, the method and system enables a higher level of utilization of computing resources. This is a result of increasing the number of applications than can be handled per CPU coupled with the inherently variable nature of demand for computing resources. Prior art systems are characterized by very low average levels of utilization for computing resources. Because it is not possible to quickly take down an application and activate a new application, a single processing resource must necessarily lie idle when demand for the application tied to that resource diminishes.

Application demand varies according to application type, type and geographic location, among other variables. By way of example, demand for enterprise applications usually peaks during business hours whereas demand for consumer-centric web sites may peak during evening hours. Peak demand times will be different in different time zones. Further, demand for processing for certain applications is less time-dependent than others. The present invention enables less time-critical applications (such as batch processing) to be run when demand for more time-critical applications (such as web applications) is low. Because the technology enables the sharing of processors between different applications, this leads to improvements in utilization levels.

Figure 22:
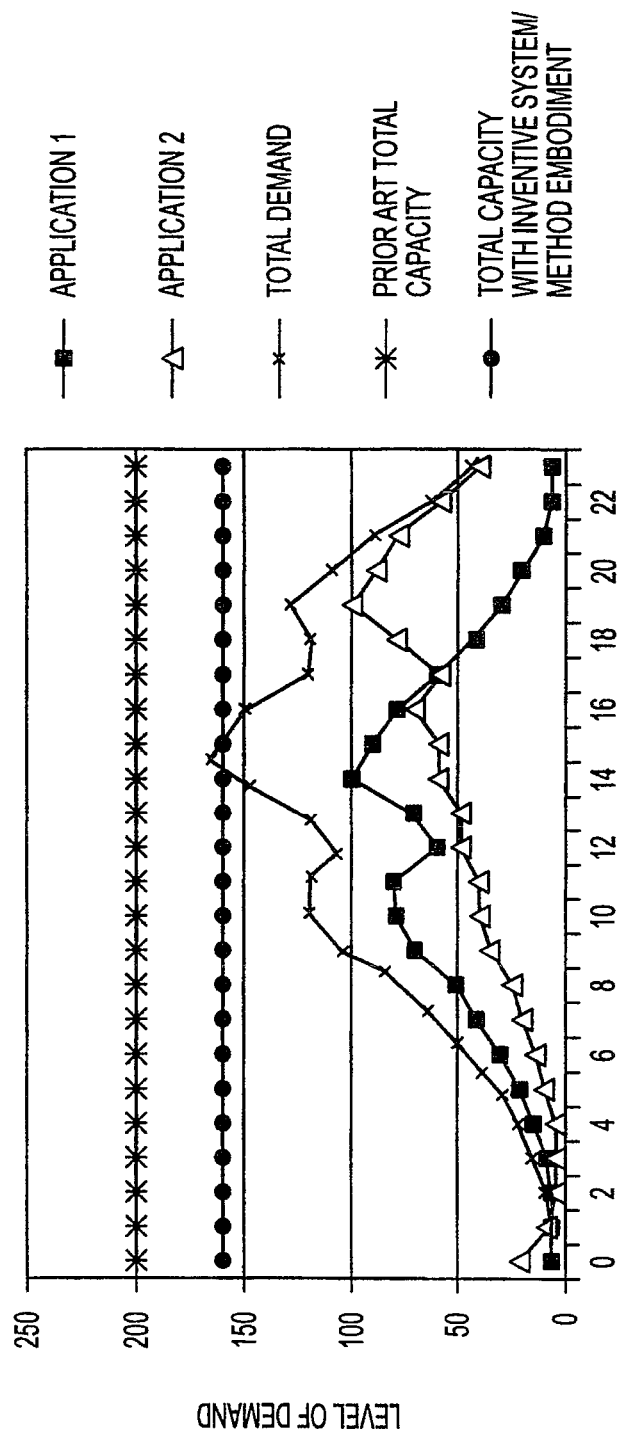
FIG. 22 depicts typical exemplary demand situation for two different applications (or customers) across a twenty-four hour time period.

FIG. 22 depicts typical exemplary demand situation for two different applications (or customers) across or over a twenty-four hour time period. Demand for Application 1 peaks at 1400 whereas demand for Application 2 peaks at 1900. With prior art systems, the amount of processing capacity that would be required to satisfy the total demand for both customers or applications is the sum of the total amount of processing capacity that would be required for each of the applications individually (in this case 200 units). With the present invention, the total amount of processing capacity required is equal to the maximum aggregated demand in any time period, in this case 160 units. This is a direct result of the inventive system and method's ability to quickly take down and set up applications result ing from the snapshot/restore technology.

The novel on-demand application processing method and system 140 creates a completely new economic model. The present invention further provides a new technology and method to share compute resources. Still further, the present invention provides the technology and method to bring compute capacity on demand very quickly. The present method and system 140 also provides for dynamic server allocation and resource sharing. Thus, providing on-demand resources at significantly reduced cost to the application provider.

It will be appreciated in light of the description provided herein that the inventive system, method, business model, and operating service moves the provisioning of utility-based or computing utility services to the next level of services, that of a true utility service. Aspects of the invention provide customers the ability to buy just what they need without being trapped into having to pay for capacity they don't use. Essentially computing services are moved from buying fixed capacity, the traditional outsourcing model, to buying variable capacity.

The inventive system and method provides on-demand computing solutions that enable enterprises to improve the server efficiency, application performance and financial return of their information technology (IT) environments. Leveraging an embedded software platform, the inventive system and method enables server infrastructure to be shared securely across applications to offer a range of computing infrastructure management, provisioning and operations solutions to enterprises and service providers with significant application investments. By dynamically allocating, retrieving and tracking computing resources, the inventive system and method enables the first true computing utility. In one embodiment, the system and method provide a service platform offering on-demand web application processing using a utility-based pricing model.

Figure 23:
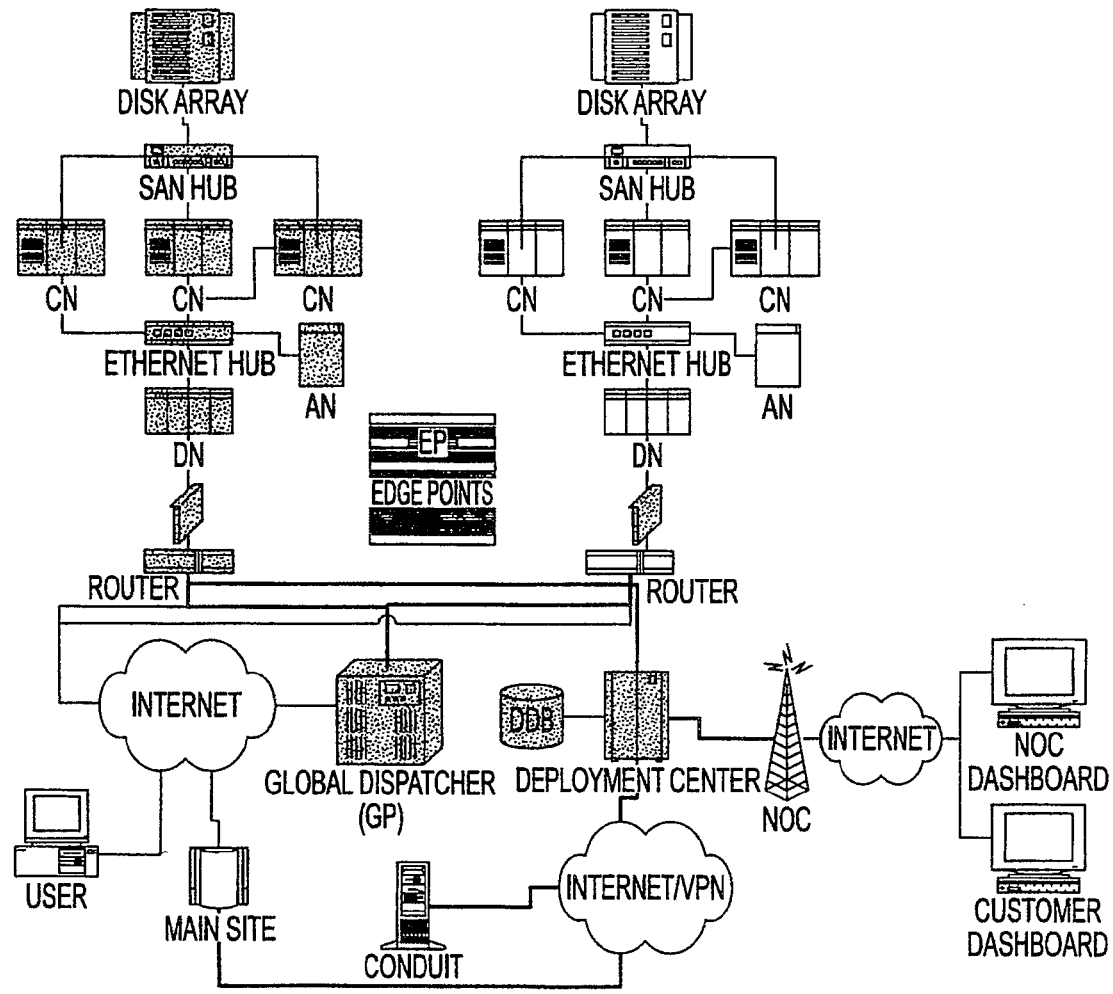
FIG. 23 is a diagrammatic illustration showing an embodiment of a system according to the invention.

While various aspects of the system and method of the invention have already been described, FIG. 23 provides a diagrammatic illustration showing an exemplary embodiment of a system according to the invention. The diagram illustrates relationships between the Internet (or other network) and routers, distribution nodes (DN), Ethernet Hub, Administrative Nodes (AN), computer nodes (CN) and SAN Hub with associated disk array. Also illustrated are the global dispatcher (GP), deployment center, and NOC. Users and a main site are also coupled to other elements of the system over the Internet or other network connection. An NOC dashboard and a customer dashboard are also provided in this particular system configuration.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

Having disclosed exemplary embodiments and the best mode, modifications and variations may be made to the disclosed embodiments while remaining within the scope of the present invention as defined by the following claims.

What is claimed is:

1. A computer readable storage medium storing instructions, which, when executed by at least a first processor performs the following:
receiving a request from an entity for processing of a first application, wherein the first application is stored as an inactive snapshot;
determining an amount of compute resources needed to satisfy the request;
restoring the first application from the snapshot onto the determined amount of compute resources to activate the first application; and
providing the entity with access to the restored first application.

2. A computer readable storage medium storing instructions, which, when executed by at least a first processor performs the following:
operating a first instance of a first application on a first amount of compute resources;
halting the first application, wherein halting the first application includes suspending one or more executable processes of the first application in an inactive state in a snapshot;
in response to halting the first application, freeing up the first amount of compute resources; and
reducing an amount charged to a first application provider providing the first application based on the first amount of compute resources freed up.

3. The computer readable storage medium as claimed in claim 2, wherein:
the freeing up the first amount of compute resources including placing the halted first application and accompanying state information into a form which can be transferred.

4. The computer readable storage medium as claimed in claim 3, wherein:
the freeing up the resources including transferring the halted first application to a memory.

5. The computer readable storage medium as claimed in claim 3, wherein:
the freeing up the resources including transferring the halted first application to a second amount of compute resources.

6. The computer readable storage medium as claimed in claim 2, further comprising:
activating a second application on a third amount of compute resources where the third amount of compute resources includes at least a portion of the freed up first amount of compute resources.

7. The computer readable storage medium as claimed in claim 6, further comprising:
increasing an amount charged to a second application provider providing the second application based on the third amount of compute resources.

8. The computer readable storage medium as claimed in claim 6, further comprising:
restoring the halted first application and accompanying state information on a second amount of compute resources to allow the second amount of compute resources to process the restored first application.

9. The computer readable storage medium as claimed in claim 2, further comprising:
receiving a request from an entity for processing of a third application;
determining an amount of compute resources needed to satisfy the request;
restoring the third application on a fourth amount of compute resources; and providing the entity with access to the restored third application.

10. The computer readable storage medium as claimed in claim 9, further comprising:
increasing an amount charged to a third application provider providing the third application based on the fourth amount of compute resources.

11. The computer readable storage medium as claimed in claim 9, wherein:

the restoring the third application including restoring the third application from a snapshotted state.

12. The computer readable storage medium as claimed in claim 9, wherein:
the entity is a user.

13. The computer readable storage medium as claimed in claim 9, wherein:
the entity is an application.

14. A computer readable storage medium storing instructions executable by one or more processors to: activate a first application such that the first application is active on a first set of compute resources; receive a first request for the first application; determine routing of the first request; route the first request to access the first application on the first set of compute resources; and determine an amount charged to a first application provider.

15. A method of providing scalable computational resources, comprising:
receiving, by a first processor-based computing resource, a first request for a first application; and
determining, by the first computing resource, routing of the first request, the determining routing including:
determining if a first instance of the first application is active;
determining if the first instance is at a capacity if the first instance of the first application is active;
determining if compute resources communicatively coupled to the first processor-based computing resource are available for activating a second instance of the first application if the first instance is at capacity; and
activating the second instance of the first application on a set of the available compute resources if the first instance is at capacity and the compute resources are available; wherein the method further comprises:
routing, by the first computing resource, the first request to access the first application, the routing including routing the first request to the second instance of the first application on the set of the available compute resources communicatively coupled to the first computing resource; and
determining an amount charged to a first application provider.

16. The method as claimed in claim 15, wherein:
the determining the amount charged includes increasing the amount charged to the first application provider based on the set of the available compute resources.

17. The method as claimed in claim 15, wherein the set of available compute resources is a first set of compute resources; wherein the method further comprises:
if in the step of determining if compute resources are available it is determined that compute resources are not available:
freeing up a second set of compute resources; activating the second instance of the first application on a third set of compute resources communicatively coupled to the first computing resource such that the third set of compute resources includes at least a portion of the freed up second set of compute resources; and
routing the request to the second instance on the third set of the compute resources 18. The method as claimed in claim 17, wherein:
the determining the amount charged includes increasing the amount charged to the first application provider based on the third set of compute resources.

19. The method as claimed in claim 17, further comprising:
the freeing up including snapshotting a first instance of a second application, wherein the second application is provided by a second application provider; and
reducing an amount charged to the second application provider based on the freed up second set of compute resources.

20. A method of providing scalable computational resources, comprising:
activating, by a first processor-based computing resource, a first application such that the first application is active on a first set of compute resources communicatively coupled to the first computing resource;
receiving, by the first computing resource, a first request for the first application;
determining, by the first computing resource, routing of the first request;
routing the first request to access the first application on the first set of compute resources; and
determining an amount charged to a first application provider.

21. The method as claimed in claim 20, wherein:
the determining the amount charged includes increasing the amount charged to the first application provider based on the first set of compute resources.

22. The method as claimed in claim 21, further comprising:
freeing up the first set of compute resources prior to activating the first application on the first set of compute resources.

23. The method as claimed in claim 22, wherein:
the determining routing includes determining that a second application operating on a second set of compute resources communicatively coupled to the first computing resource is to be snapshotted;
the freeing up includes snapshotting the second application to free up the second set of the compute resources to allow the first application to be activated on the first set of compute resources, wherein the first set of compute resources includes at least a portion of the second set of compute resources.

24. The method as claimed in claim 23, further comprising:
reducing an amount charged to a second application provider providing the second application proportional to the second set of compute resources.

25. A method of providing scalable computational resources, comprising:
receiving, by a first processor-based computing resource, a first request for a first application;
determining, by the first processor-based computing resource, routing of the first request, the determining the routing including determining if the requested first application is currently active on compute resources communicatively coupled to the first computing resource;
routing, by the first processor-based computing resource, the first request to access the first application on the compute resources communicatively coupled to the first computing resource; and
determining an amount charged to a first application provider.

26. The method as claimed in claim 25, further comprising:
the determining the routing including determining that a first set of the compute resources is an optimal set of compute resources to utilize in activating the first application if the first application is not currently active;
activating the first application such that the first application is active on the first set of the compute resources; and the determining the amount charged including increasing the amount charged proportional to a metered amount of the first set of compute resources used.

27. The method as claimed in claim 26, wherein:
the determining the optimal set of compute resources includes determining which of a plurality of compute modules is least utilized.

28. The method as claimed in claim 26, wherein:
the determining routing includes determining which of a plurality of compute resources is an optimal compute resource.

29. A system, comprising:
one or more processor-based computer systems, each respective one of the computer systems including a processor communicatively coupled to a computer readable storage device, each of the computer readable storage devices storing program instructions, which program instructions, when executed by a respective processor of its respective one of the computer systems, cause the respective processor to:
   activate a first application such that the first application is active on a first set of compute resources;
   receive a first request for the first application;
   determine routing of the first request;
   route the first request to access the first application on the first set of compute resources; and
   determine an amount charged to a first application provider.

* * * * *